(12) United States Patent
Sakamoto

(10) Patent No.: US 7,850,243 B2
(45) Date of Patent: Dec. 14, 2010

(54) RECLINING ADJUSTER

(75) Inventor: Yutaka Sakamoto, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 296 days.

(21) Appl. No.: 11/795,887

(22) PCT Filed: Jan. 27, 2006

(86) PCT No.: PCT/JP2006/301336

§ 371 (c)(1),
(2), (4) Date: Jul. 24, 2007

(87) PCT Pub. No.: WO2006/080446

PCT Pub. Date: Aug. 3, 2006

(65) Prior Publication Data

US 2008/0164741 A1    Jul. 10, 2008

(30) Foreign Application Priority Data

Jan. 27, 2005 (JP) .............................. 2005-019945

(51) Int. Cl.
*B60N 2/23* (2006.01)

(52) U.S. Cl. ..................................................... 297/362

(58) Field of Classification Search ............ 297/354.12, 297/362
See application file for complete search history.

(56) References Cited

U.S. PATENT DOCUMENTS

| | | | |
|---|---|---|---|
| 647,473 A | 4/1900 | Bunnel et al. | |
| 6,076,889 A * | 6/2000 | Su et al. | 297/362 |
| 6,428,104 B1 * | 8/2002 | Sakamoto et al. | 297/362.11 |
| 6,764,136 B2 * | 7/2004 | Sakamoto | 297/362.14 |
| 6,976,738 B2 * | 12/2005 | Sakamoto | 297/362.14 |
| 7,192,090 B2 * | 3/2007 | Sakamoto | 297/362.14 |
| 7,380,763 B2 * | 6/2008 | Sakamoto | 248/422 |
| 2003/0160489 A1 | 8/2003 | Sakamoto | |
| 2004/0135415 A1 | 7/2004 | Sakamoto | |

FOREIGN PATENT DOCUMENTS

| | | | |
|---|---|---|---|
| DE | 1088827 | * | 9/1960 |
| JP | 427950 | * | 4/1967 |
| JP | A 52-051624 | | 4/1977 |
| JP | U 64-21640 | | 2/1989 |
| JP | A 08-38289 | | 2/1996 |
| JP | A 2000-342371 | | 12/2000 |
| JP | A 2001-010386 | | 1/2001 |
| JP | A 2003-319849 | | 11/2003 |
| JP | A 2004-189137 | | 7/2004 |

* cited by examiner

*Primary Examiner*—Joseph Edell
(74) *Attorney, Agent, or Firm*—Oliff & Berridge, PLC

(57) ABSTRACT

A reclining adjuster has a lower bracket fixed to a seat cushion; an upper bracket fixed to a seatback and connected to the lower bracket so as to be rotatable about a shaft; a lock mechanism capable of having a locked state where rotation of the upper bracket relative to the lower bracket is locked and a released state where the lock is released; and an emergency lock mechanism for preventing relative rotation between the lock mechanism and the upper bracket when it occurs. In the emergency lock mechanism, when a cam projection of an outer toothed ring gear is pressed in the circumferential direction by a cam pin of a disk member by the relative rotation therebetween, the outer toothed ring gear meshes with both inner teeth of the lower bracket and inner teeth of the upper bracket.

18 Claims, 13 Drawing Sheets

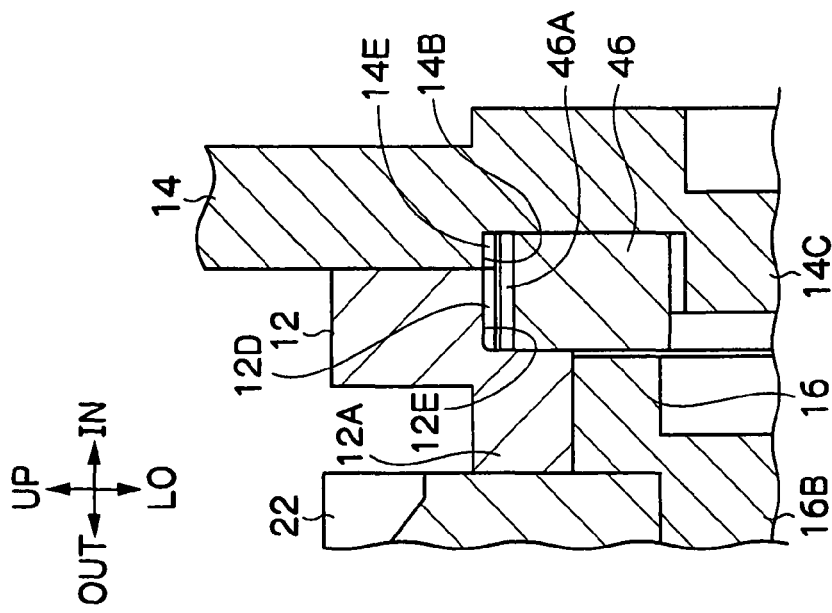
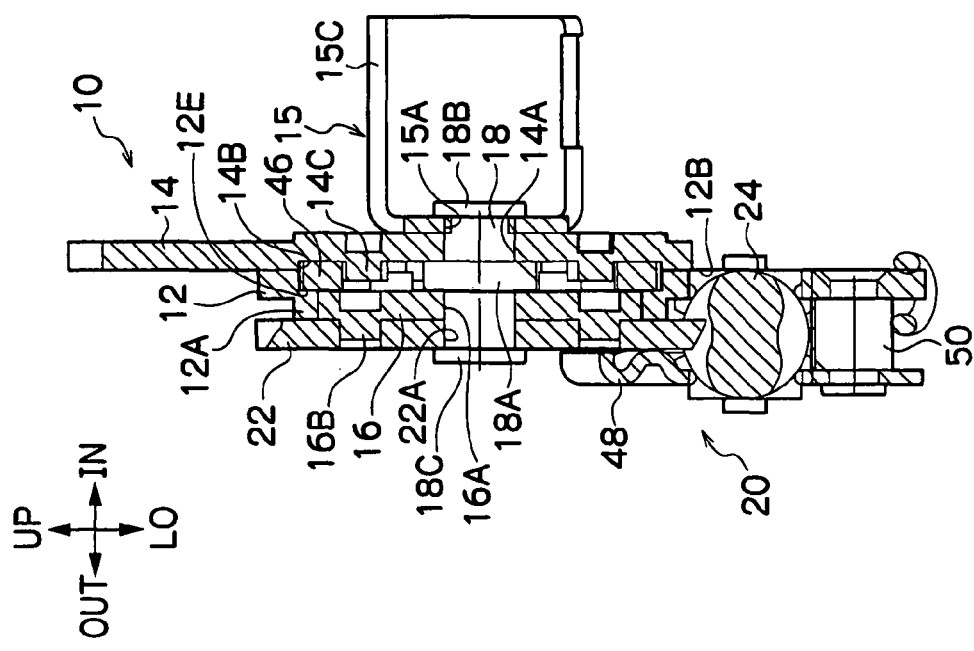

F I G. 1 2
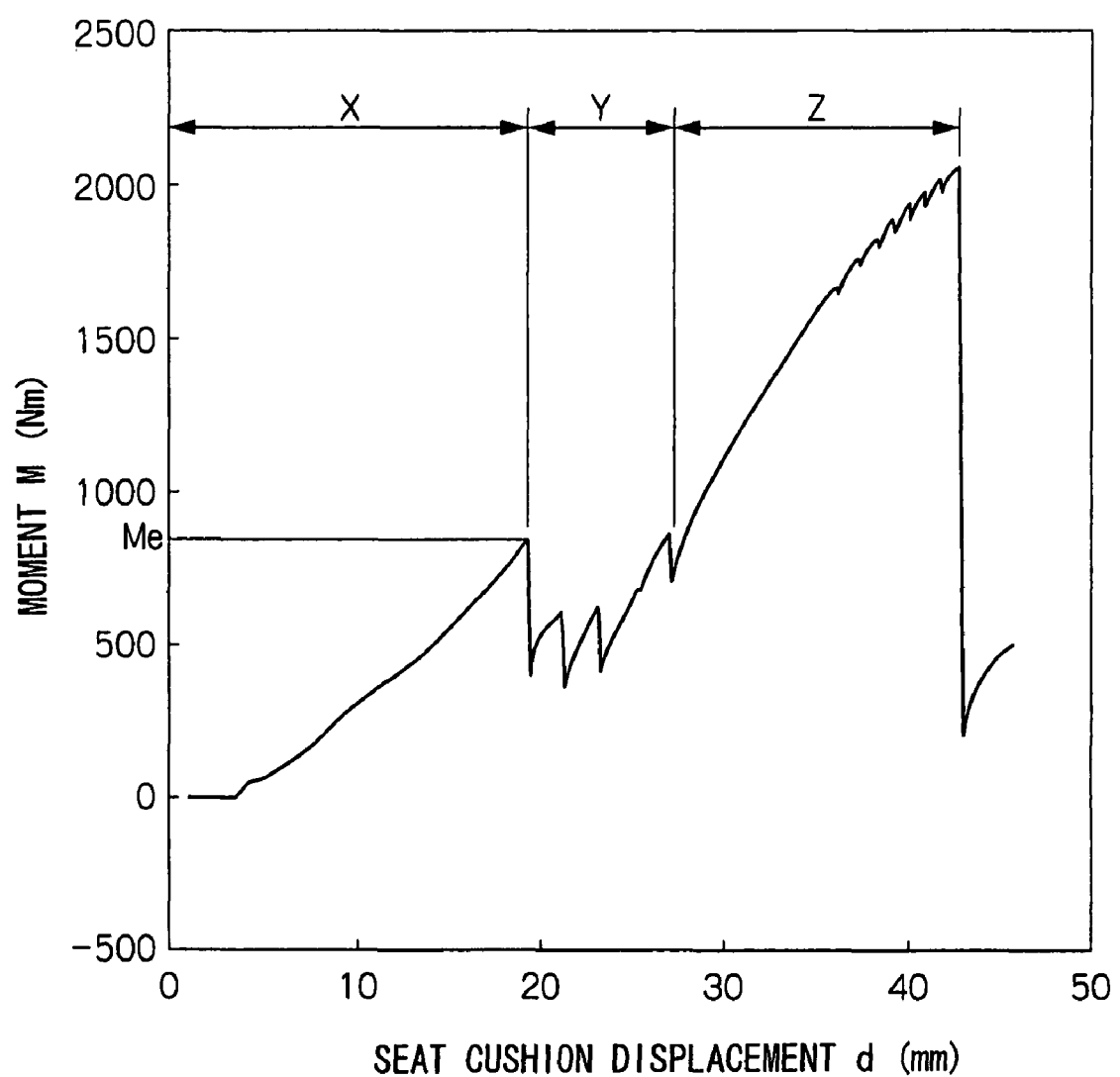

F I G. 1 3
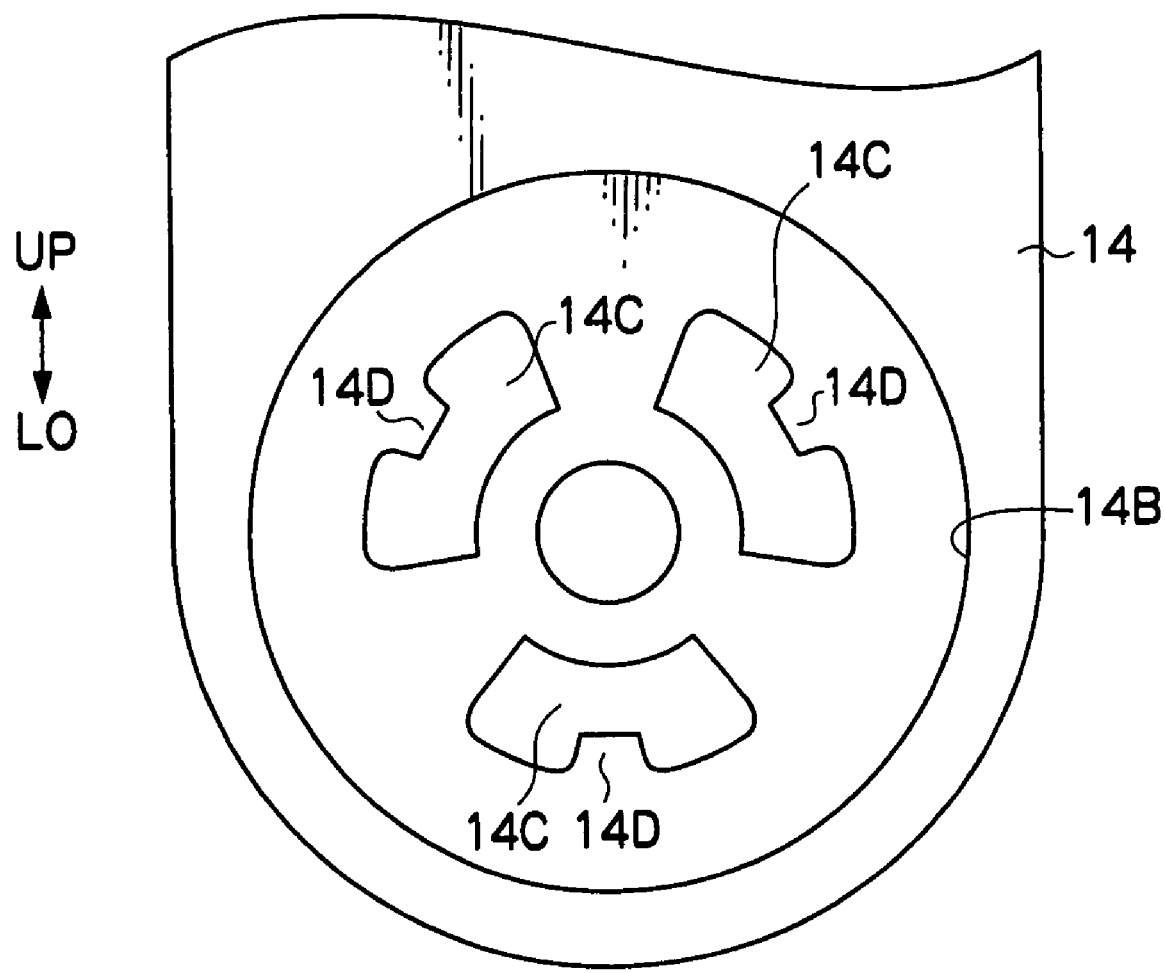

RECLINING ADJUSTER

TECHNICAL FIELD

The present invention relates to a reclining adjuster for adjusting the reclining angle of a seatback relative to a seat cushion.

RELATED ART

Reclining adjusters are known that are configured with a worm wheel that is fixed to a seatback side member so as to rotate coaxially and integrally relative to the seatback, the worm wheel being engaged with a worm that is axially rotatably supported by a seat cushion side member, (see, for example, Japanese Patent Application (JP-A) No. 2000-342371). In this configuration, in the worm and worm wheel, the lead angle is made larger than the friction angle, and in the unlocked state of the worm continuously variable adjustment of the reclining angle of the seatback relative to the seat cushion is permitted, and by locking the rotation of the worm the seatback is retained at a given reclining angle.

Furthermore, in such a reclining adjuster, a technique is known in which the worm is pressed toward the worm wheel side by the biasing force of a spring, transferred through an arm member having an engaging pawl, locking rotation of the worm (see, for example, JP-A No. 2003-319849). By doing so, when the reclining angle is locked, a backlash between the worm and the worm wheel, which is a cause of extraneous noise generation and a reduction in seating comfort, may be reduced.

In addition, in a reclining adjuster as above, a configuration is known in which an outer toothed gear is provided that is usually positioned on the inside in the radial direction of inner teeth provided at the seat cushion side, and, when a load that is of a given value or greater acts on the seatback, the outer toothed gear is deformed by relative angular displacement of the seatback with respect to the seat cushion due to the load, thereby meshing with the inner teeth. In this configuration, since the function of preventing tilting of the seatback in an emergency, such as a collision, is performed by the emergency lock mechanism configured by the inner teeth and the outer teeth, the worm and worm wheel that configure the lock mechanism are not increased in size, and yet the necessary strength is secured (see, JP-A No. 2004-189137).

DISCLOSURE OF THE INVENTION

Problem to be Solved by the Invention

However, in the field of reclining adjusters, further size reduction, increase in strength and reduction in backlash is desired, and there is further room for improvement in the structure of the lock in normal use or in an emergency.

The present invention is made in consideration of the above circumstances and an object thereof is to provide a reclining adjuster that is able to reliably lock the rotation of the seatback relative to the seat cushion.

Method of Solving the Problem

A first aspect of the present invention provides a reclining adjuster including: a first bracket, fixed to a seat cushion; a second bracket, rotatably connected to the first bracket and fixed to a seatback, such that changes in a reclining angle of the seatback relative to the seat cushion are possible; a lock mechanism, provided between the first bracket and the second bracket, and able to adopt a locked state retaining the second bracket at a given reclining angle relative to the first bracket, and to adopt a released state permitting changes to the angle of the second bracket relative to the first bracket; an engaging member provided to one or other of the first bracket or the second bracket so as to rotate integrally in the direction of changing the reclining angle; a first engageable portion, provided to the first bracket and engageable by the engaging member; a second engageable portion, provided to the second bracket and engageable by the engaging member; and an emergency lock actuation mechanism, provided between the second bracket and the lock mechanism, and when the lock mechanism is in the locked state and a relative rotation of a predetermined angle or greater is generated between the second bracket and the lock mechanism, the emergency lock actuation mechanism engaging the engaging member with each of the first engageable portion and the second engageable portion, and preventing the relative rotation.

A second aspect of the present invention provides a reclining adjuster including: a first bracket, fixed to a seat cushion; a second bracket, rotatably connected to the first bracket and fixed to a seatback, such that changes in a reclining angle of the seatback relative to the seat cushion are possible; a lockable member, provided on the second bracket so as to rotate integrally therewith relative to the first bracket; a lock member, that adopts a locked position in which it engages with the lockable member and locks rotation of the lockable member relative to the first bracket, and that adopts a released position that releases the engaging state and permits rotation of the lockable member relative to the first bracket; and a connecting member that connects the second bracket and the lockable member such that they do not move closer together or further apart in the rotational axial line direction relative to the first bracket.

A third aspect of the present invention provides a reclining adjuster including: a first bracket, fixed to a seat cushion; a second bracket, rotatably connected to the first bracket and fixed to a seatback, such that changes in a reclining angle of the seatback relative to the seat cushion are possible; a first gear that is rotatably axially supported at the first bracket through a shaft bearing; a second gear that is axially supported so as to be able to rotate around the shaft integrally with the second bracket, and is able to drive the first gear by the rotation; a lock switching mechanism provided so that it is able to angularly displace the axial line of one or other of the first gear or the second gear, and is able to switch, by the angular displacement, between an unlocked state in which the first gear is able to be driven from the second gear side, and a locked state in which it is not possible for the first gear to be driven from the second gear side.

A fourth aspect of the present invention provides a reclining adjuster including: a pair of, left and right, lock mechanisms, respectively provided between a seatback and a seat cushion, and able to adopt a locked state in which the seatback is maintained at a given angle relative to the seat cushion, and able to adopt a released state in which changes in a reclining angle of the seatback relative to the seat cushion are permitted; a pair of, left and right, switching mechanisms, respectively provided to the lock mechanisms and switching the lock mechanisms between the locked state and the released state; and a coupling mechanism, coupling the left and right switching mechanisms such that the switching operation range of the switching mechanism on a driven side is greater than the switching operation range of the switching mechanism on a main driving side in each of the locking direction and the releasing direction.

EFFECT OF THE INVENTION

The reclining adjuster according to the invention explained above has a superior effect, which is being able to reliably lock rotation of the seatback relative to the seat cushion.

BRIEF DESCRIPTION OF THE DRAWINGS

FIG. 4A is a cross-section on 4-4 of FIG. 2.

FIG. 4B is a cross-section showing an expanded view of a main portion of FIG. 4A.

FIG. 12 is diagram showing the relationship between the displacement and the moment, when a large load is imparted to a seatback of a vehicle seat to which the reclining adjuster according to an exemplary embodiment of the present invention is applied.

FIG. 13 is a lateral view showing an example modification of an upper bracket configuring a reclining adjuster according to an exemplary embodiment of the present invention.

BEST MODE OF IMPLEMENTING THE INVENTION

Explanation will now be given of a reclining adjuster 10 according to an exemplary embodiment of the present invention, based on FIG. 1 to FIG. 12. In the figures arrows UP, arrows LO, arrows FR, arrows RE, arrows IN, and arrows OUT show, with respect to a vehicle seat to which the reclining adjuster 10 is applied, or to an seat occupant, the front direction (direction of vehicle progression), rear direction, upper direction, lower direction, inside width (left/right) direction, and outside width direction respectively. Below, when reference is simply made to upper, lower, front, rear, and inside/outside width directions then these correspond to the above named arrow directions.

Figure 1:
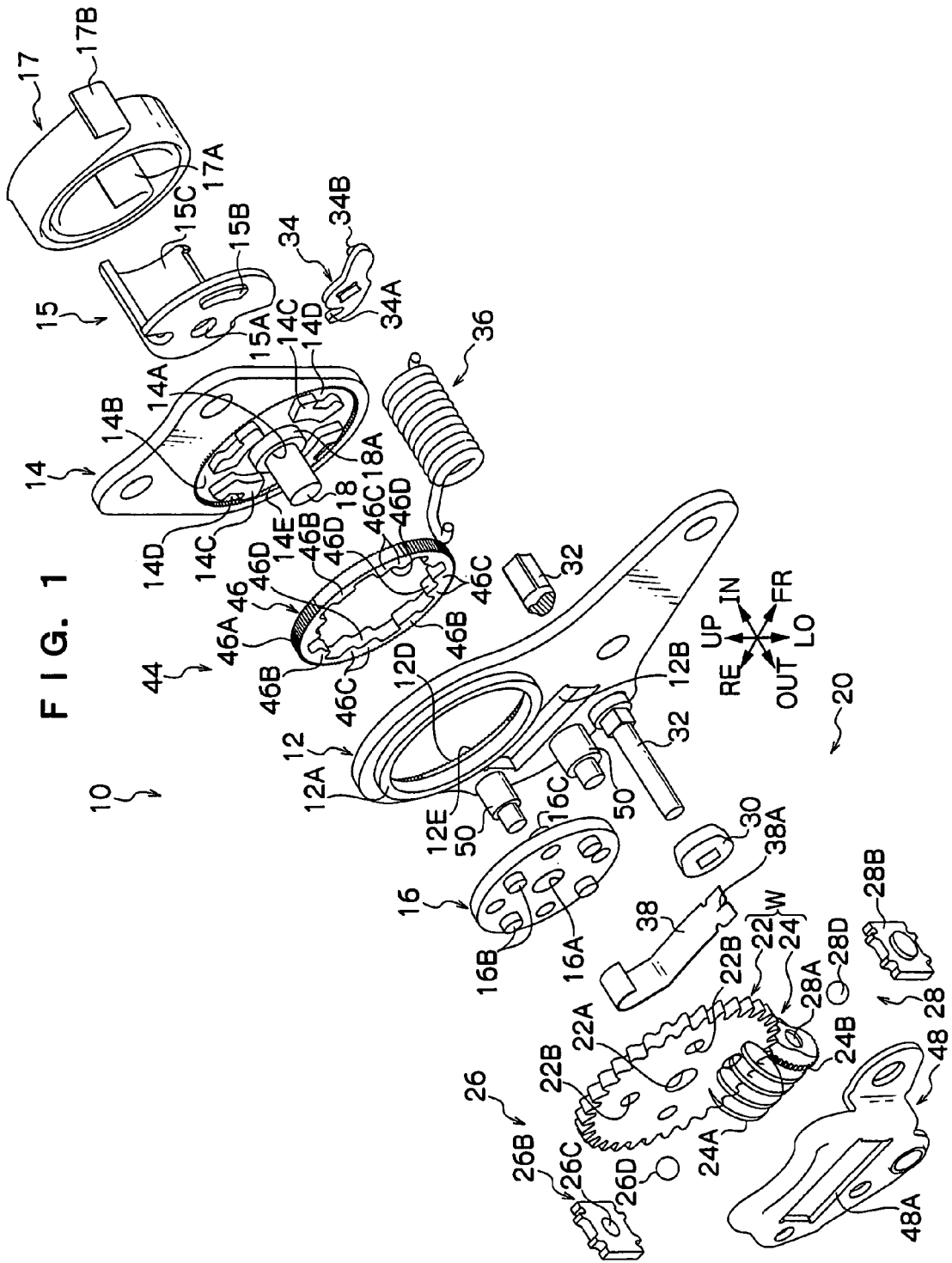
FIG. 1 is an exploded perspective diagram of a reclining adjuster according to an exemplary embodiment of the present invention.
Figure 2:
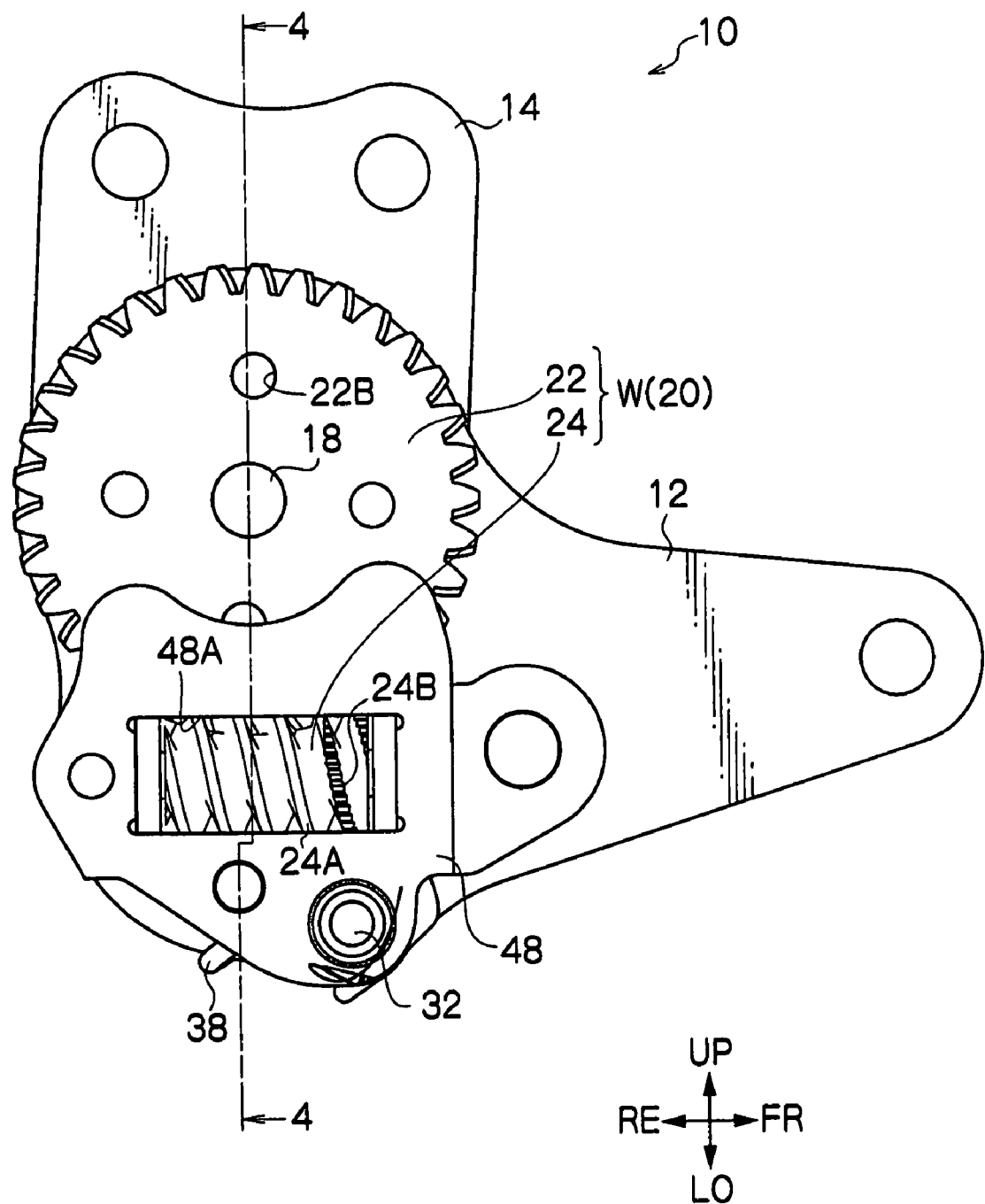
FIG. 2 is a lateral view, as seen from the outside in the width direction, of a reclining adjuster according to an exemplary embodiment of the present invention.
Figure 3:
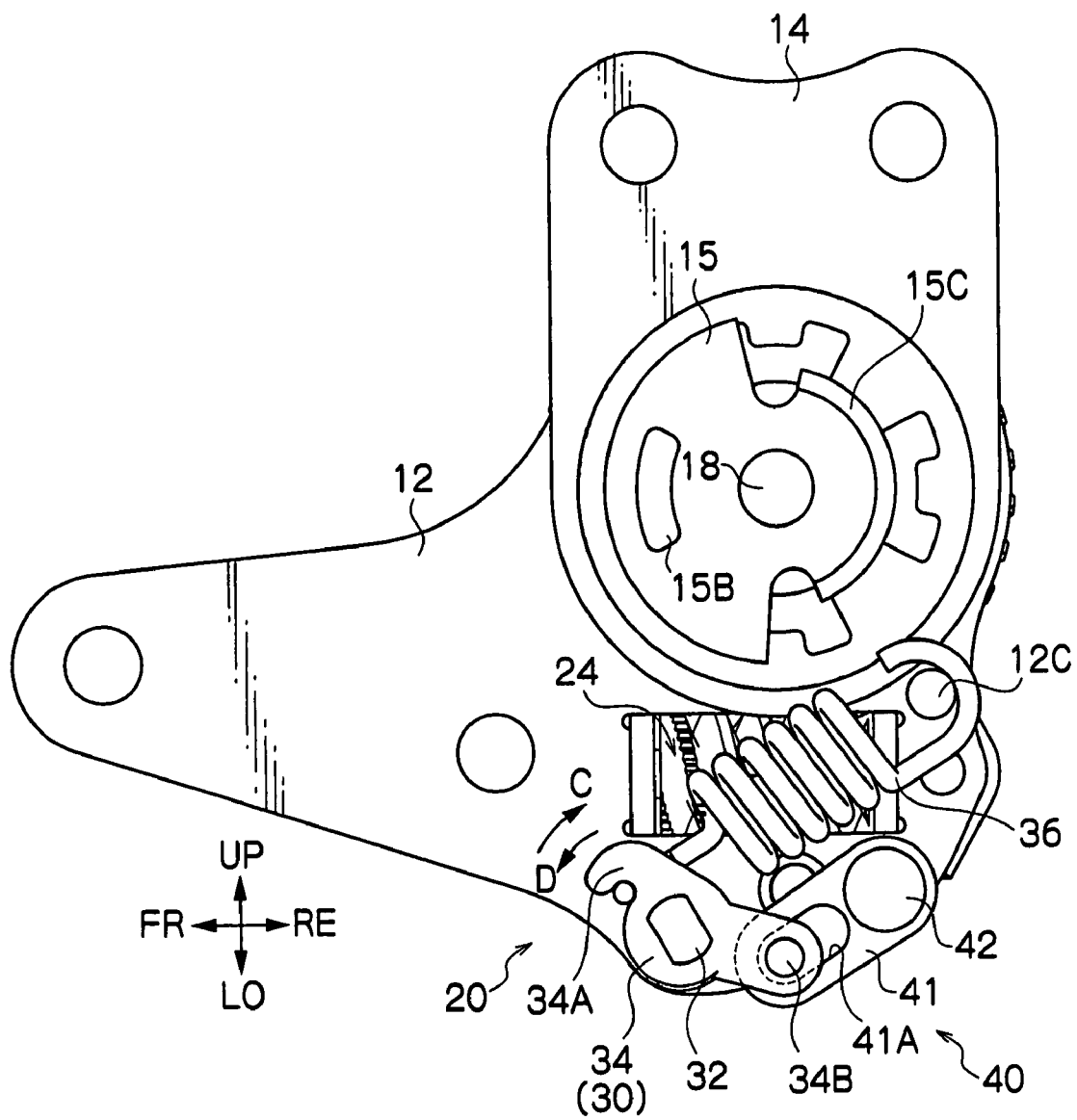
FIG. 3 is a lateral view, as seen from the inside in the width direction, of a reclining adjuster according to an exemplary embodiment of the present invention.

In FIG. 1 is shown an exploded perspective diagram of the reclining adjuster 10, and in FIG. 2 and FIG. 3 are shown mutually lateral views from opposite sides in the width direction of the reclining adjuster 10. In addition, in FIG. 4A is shown a cross-section on 4-4 of FIG. 2. As shown in these figures, the reclining adjuster 10 is provided with a first bracket of a lower bracket 12 that is fixed to a non illustrated seat cushion. An upper bracket 14, serving as a second bracket, is axially supported at the lower bracket 12, so as to be rotatable about an axial line that is along the width direction.

Specifically, as shown in FIG. 1 to FIG. 4, the lower bracket 12 has a boss 12A that protrudes toward the outside in the width direction of the vehicle seat, and a circular plate shaped disk member 16 is fitted within the boss 12A so as to be rotatable (slidingly movable in the circumferential direction). A through hole 16A is formed in an axial center portion of the disk member 16, and a shaft 18 is fitted into the through hole 16A as a rotational shaft. The shaft 18 is also fitted into a through hole 14A provided in the upper bracket 14. By so doing, the upper bracket 14 is axially supported by the lower bracket 12, through the shaft 18 and the disk member 16, so as to be rotatable. Explanation will be given later of the configuration of the shaft 18 as the "connecting member" according to the present invention.

In the reclining adjuster 10, it is configured such that the upper bracket 14 is fixed to the seatback of a non illustrated vehicle seat, and the seatback is able to be reclined relative to the seat cushion by rotation of the upper bracket 14 relative to the lower bracket 12. The lower bracket 12 is fixed at an edge portion in the width direction of the seat cushion, and at the rear side thereof, and the upper bracket 14 is fixed at the lower edge side of the seatback.

Furthermore, as shown in FIG. 1 to FIG. 3, a spring attachment member 15 is fixed to the upper bracket 14 in a non rotation state. The shaft 18 is fitted through a through hole 15A formed in an axial center portion of the spring attachment member 15, so that the spring attachment member 15 is disposed on the opposite side to that of the lower bracket 12, and a protrusion 15B that is formed at an eccentric position on the spring attachment member 15 is inserted into a recess (a thinned portion on the reverse side face of the later described connecting protrusion 14C) and preventing the spring attachment member 15 from rotating. An inside end 17A of a coiled balance spring (power spring) 17 is anchored at a substantially semi-circular shaped spring attachment portion 15C that protrudes in the width direction from the spring attachment member 15, and an outside end 17B of the balance spring 17 is anchored to a non illustrated spring attachment portion of the lower bracket 12. The upper bracket 14 is biased in the forward reclining direction relative to the seat cushion by the biasing force of the balance spring 17.

Also, the reclining adjuster 10 is provided with a lock mechanism 20, serving as a lock means, selectively able to adobt: an unlocked state (released state), which permits rotation of the upper bracket 14 relative to the lower bracket 12 about the shaft 18; and a locked state, that locks rotation of the upper bracket 14 relative to the lower bracket 12 about the shaft 18.

The lock mechanism 20 is provided with a lockable member that rotates coaxially and integrally with the upper bracket 14 relative to the lower bracket 12, a worm wheel 22, serving as a second gear; and a lock member that is axially supported by the lower bracket 12 so at to be rotatable and that also meshes with the worm wheel 22, and a worm 24, serving as a first gear. A worm gear W, configured by the worm 24 and the worm wheel 22, has a lead angle that is larger than the friction angle, and is configured such that rotation of the worm wheel 22 is able to rotationally drive the worm 24. The lock mechanism 20 is configured such that by stopping (locking) axial rotation of the worm wheel 22 about the axial center, switching is carried out from the above unlocked state to the locked state.

The worm wheel 22 is disposed on the opposite side of the lower bracket 12 to that of the upper bracket 14 in the width direction, and by the shaft 18 being fitted through a through hole 22A formed in an axial center portion of the worm wheel 22, the worm wheel 22 is able to rotate coaxially with the upper bracket 14 relative to the lower bracket 12. Furthermore, there are through holes 22B formed at even intervals in a circumferential direction at plural locations (four locations in this exemplary embodiment) distanced from the axial center of the worm wheel 22, and connecting pins 16B that protrude from the disk member 16 intrude into each of the through holes 22B. Furthermore, the disk member 16 is configured such that it integrally rotates with the upper bracket 14 relative to the lower bracket 12 through a later described emergency lock mechanism 44. In this manner, the worm wheel 22 rotates integrally with the upper bracket 14 relative to the lower bracket 12, as described above. There are respective thinned portions formed on the reverse side face of each of the connecting pins 16B on the disk member 16.

Also, the worm 24 is disposed to the lower side of the worm wheel 22, with the axial line direction of the worm 24 being substantially in the front-rear direction, and the worm 24 is axially supported through shaft bearings 26, 28, such that the worm 24 is able to rotate about the axial line direction relative to the lower bracket 12. Furthermore, in order not to interfere with the worm 24, there is a window 12B formed in the lower bracket 12, so that a portion of the worm 24 may intrude therein, contributing to a reduction in the thickness of the reclining adjuster 10.

Figure 5:
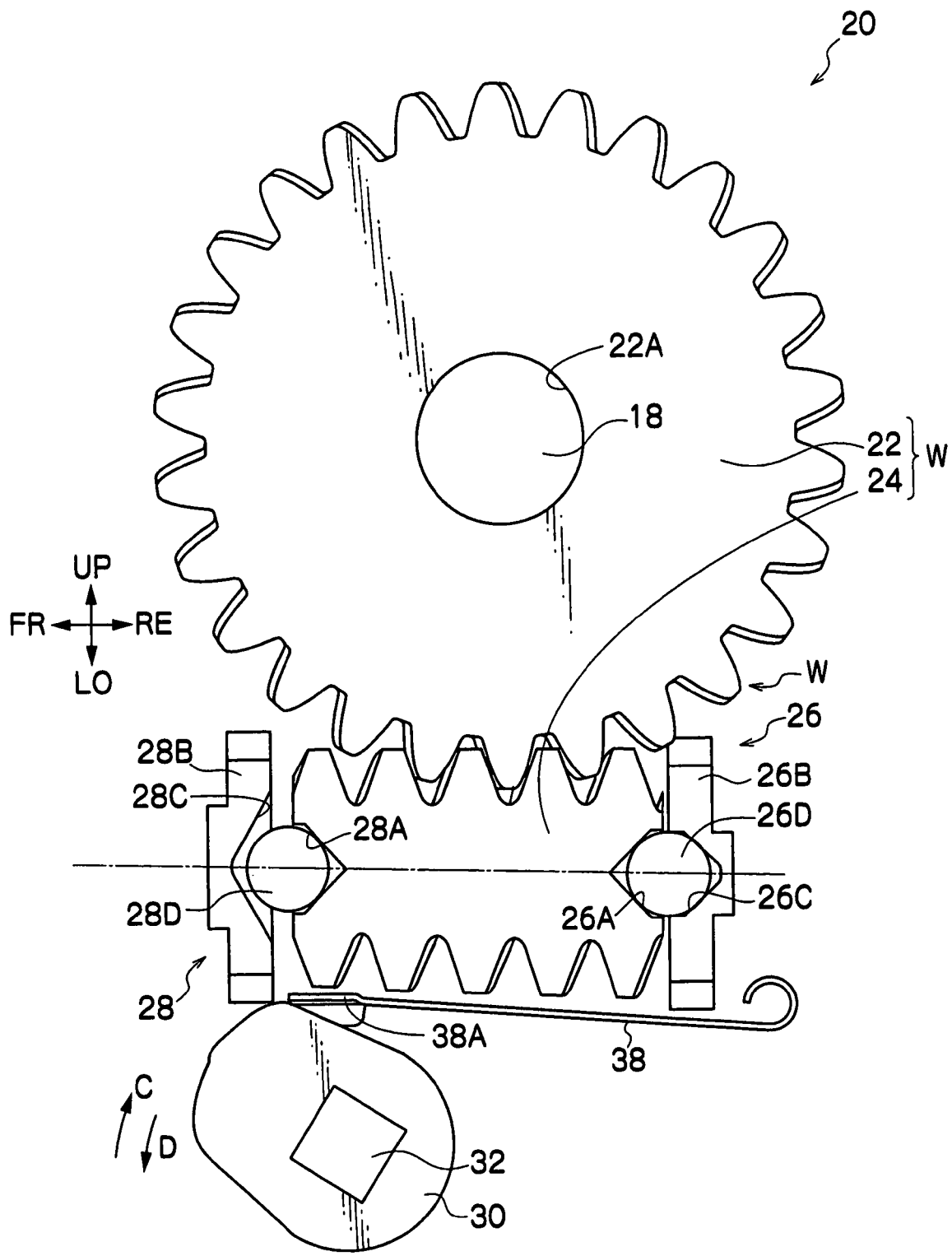
FIG. 5 is a lateral cross-section showing an unlocked state of a lock mechanism configuring a reclining adjuster according to an exemplary embodiment of the present invention.

As shown in FIG. 5, the rear side shaft bearing 26 is configured with: a worm side recess 26A, recessed into an axial center portion at the rear end of the worm 24; a bracket side recess 26C, recessed into a shaft bearing member 26B that is fixed to the lower bracket 12 so as to open toward the worm side recess 26A; and a ball 26D, which intrudes into the worm side recess 26A and the bracket side recess 26C, respectively. The worm side recess 26A and the bracket side recess 26C each have internal faces that form substantially circular conical surfaces, with each apex angle being about 90° and with the area of the openings thereof being the same.

Also, the front side shaft bearing 28 is configured with: a worm side recess 28A, recessed into an axial center portion at the front end of the worm 24; a bracket side recess 28C, recessed into a shaft bearing member 28B that is fixed to the lower bracket 12 so as to open toward the worm side recess 28A; and a ball 28D, which intrudes into the worm side recess 28A and the bracket side recess 28C, respectively. The worm side recess 28A and the bracket side recess 28C each have internal faces that form substantially circular conical surfaces.

The worm 24 is supported in the above manner in both the radial direction and the thrust direction by the front and rear shaft bearings 28, 26. FIG. 5 shows the unlocked state of the lock mechanism 20, and in this unlocked state the upper bracket 14 is able to rotate relative to the lower bracket 12, due to the lead angle of the worm gear W being larger than the friction angle thereof, as described above. In the lock mechanism 20, it is configured such that by the front portion of the worm 24 moving to the worm wheel 22 side and the worm 24 pressing against the worm wheel 22, the lock mechanism 20 changes over into the locked state shown in FIG. 6, in which rotation of the worm wheel 22, that is to say rotation of the upper bracket 14 relative to the lower bracket 12, is prevented.

In order to permit such a movement of the worm 24, there are gaps set between the worm 24 and the shaft bearings 26, 28 in the radial direction and the thrust direction (shown at the shaft bearing 28 side in FIG. 5). Furthermore, in the present exemplary embodiment, the bracket side recess 28C has an apex angle that is larger than 90°, and the surface area of the opening thereof is set to be larger than that of the worm side recess 28A. In the lock mechanism 20 when the vicinity of the front end of the worm 24 is pressed upward from the unlocked state shown in FIG. 5 and FIG. 7A, the worm 24 is guided by the circular conical surface of the bracket side recess 28C, through the ball 28D, and it is configured such that as the front end is moved upward, as shown in FIG. 6 (the direction shown by arrow A), the front end moves toward the outside in the width direction (the direction shown by arrow B), as shown in FIG. 7.

Figure 6:
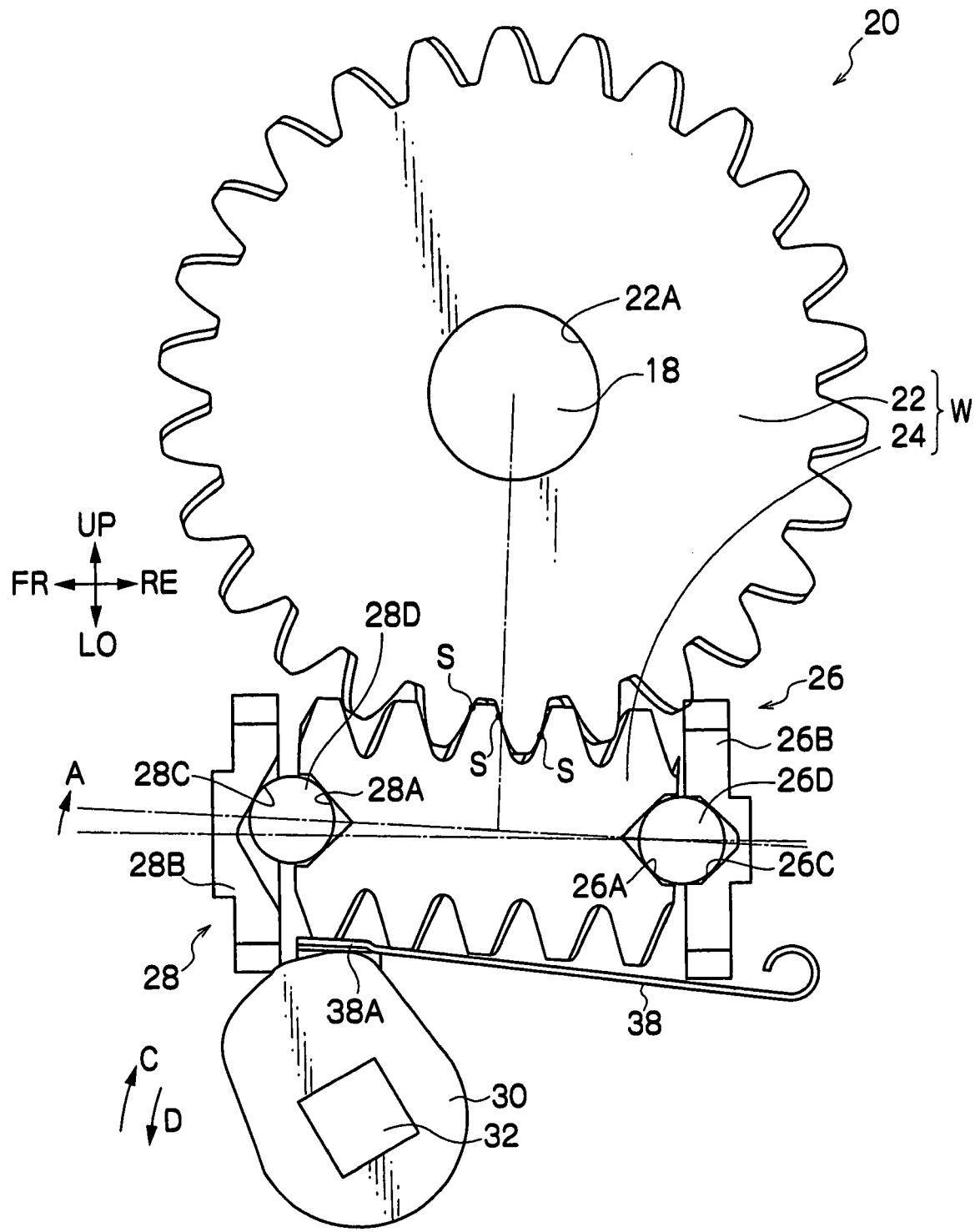
FIG. 6 is a lateral cross-section showing a locked state of a lock mechanism configuring a reclining adjuster according to an exemplary embodiment of the present invention.
Figure 7A:
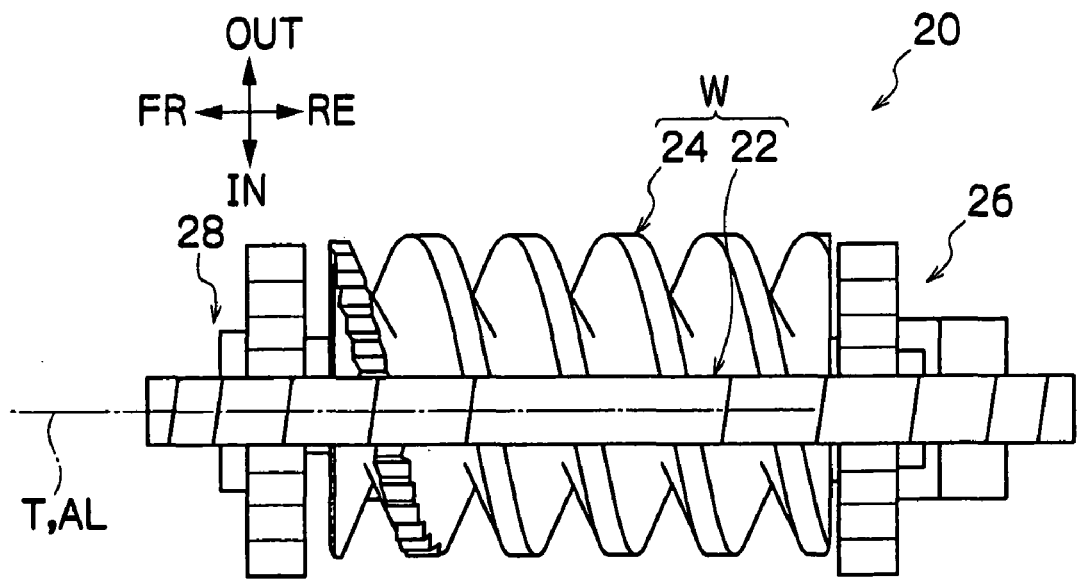
FIG. 7A is a plan view showing an unlocked state of a lock mechanism configuring a reclining adjuster according to an exemplary embodiment of the present invention.
Figure 7B:
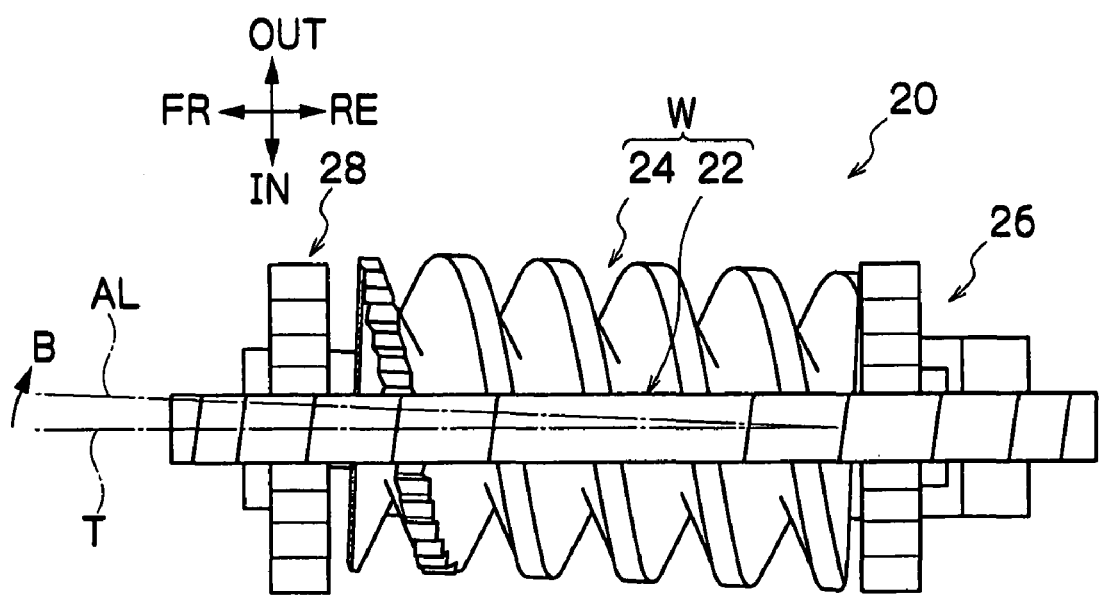
FIG. 7B is a plan view showing a locked state of a lock mechanism configuring a reclining adjuster according to an exemplary embodiment of the present invention.

By doing so, the axial line AL of the worm 24 is inclined not just in the up-down direction as shown in FIG. 6, but also the axial line AL is inclined relative to plane T that is orthogonal to the axial line of the worm wheel 22, as shown in FIG. 7. In this state, the apparent frictional angle of the worm gear W becomes larger than the lead angle thereof, and rotational driving of the worm 24 from the worm wheel 22 side becomes impossible. Therefore, in this state, rotation of the upper bracket 14 relative to the lower bracket 12 is locked, and becomes the locked state. Then, in the locked state, as shown in FIG. 6, there are at least two points (in this exemplary embodiment three points) where the worm 24 that is pressed up toward the worm wheel 22 is in contact with the worm wheel 22, at contact points S, and backlash is eliminated.

Furthermore, the lock mechanism 20 is provided with a lock switching mechanism for changing between the locked state and the unlocked state, and the lock switching mechanism is, as shown in FIG. 1, provided with a cam member 30 that presses from the underside in the vicinity of the front end of the worm 24 toward the worm wheel 22 side. The cam member 30 is fitted over a cam shaft 32 that is supported so as to be able to rotate around the axial line along the width direction of the lower bracket 12, in a state in which rotation is prevented between the cam member 30 and the cam shaft 32. As shown in FIG. 5 and FIG. 6, the cam member 30 is an eccentric cam, and is configured so as to be able to selectively switch between the unlocked position shown in FIG. 5 and the locked position shown in FIG. 6, by rotation about the axial center of the cam shaft 32. The cam member 30 is configured to move to the locked position by rotation in the direction of arrow C shown in FIG. 5, and moves to the unlocked position by rotation in the opposite direction to the arrow C, the direction of arrow D.

Also, a plate spring member 38, which is long in the front-rear direction and has a rear end that is supported by the lower bracket 12 (wrapped around a later described separator 50), is disposed between the cam member 30 and the worm 24. The front end of the plate spring member 38 is always in contact with the upper side of the cam member 30 due to the recovery force therein, and is separated from the worm 24 in the unlocked state, and also transmits the pushing force of the cam member 30 to the worm 24 in the locked state. There is a low, upward protruding, ridged portion 38A formed by bending or the like, as shown in FIG. 1, at a central portion in the width direction at the front end of the plate spring member 38. The ridged portion 38A, in the locked state, intrudes shallowly into notches 24B that are formed substantially parallel to the front-rear direction (the axial line direction of the worm 24) at a front end portion of teeth 24A of the worm 24. The plate spring member 38 is configured so as to, while engaging the ridged portion 38A in the notches 24B, deform appropriately to follow the tilting of the worm 24 in the above direction of arrow B (or to move over one of the notches 24B to engage in another of the notches 24B), and so as to not be an impediment to the tilting in the direction of arrow B of worm 24 (movement to the locked position).

Figure 8:
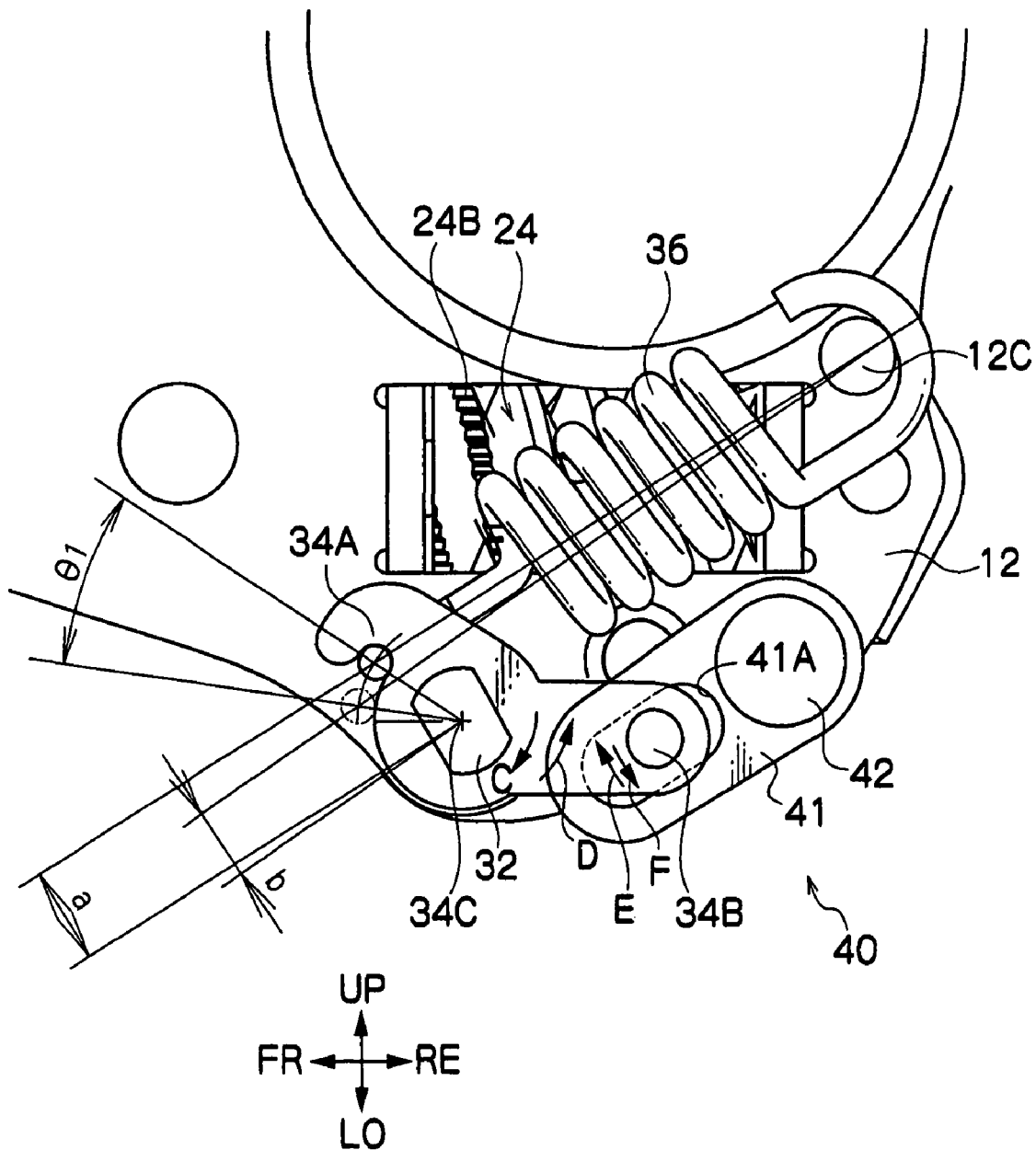
FIG. 8 is a lateral view showing a lock switching mechanism configuring a reclining adjuster according to an exemplary embodiment of the present invention.

Furthermore, the cam shaft 32 is fitted into, at the opposite side of the lower bracket 12 to that of the cam member 30, a longitudinal direction intermediate portion of an arm member 34, in a state preventing rotation, and the arm member 34 is coaxially and integrally rotatable with the cam shaft 32, and therefore with the cam member 30. As shown in FIG. 8, one end of a tension coil spring 36 is anchored in a tensioned state to a spring retaining portion 12C of the lower bracket 12, and the other end of the tension coil spring 36 is anchored to a spring retaining portion 34A formed at a front end portion of the arm member 34. The spring retaining portion 12C is located above the spring retaining portion 34A, and the arm member 34, and therefore the cam member 30, is constantly biased in the direction of arrow C by the biasing force of the tension coil spring 36.

Therefore, the lock mechanism 20 is configured so as to normally adopt the locked state in which the front end of the worm 24 is pressed by the cam member 30 from below and retained in the locked position. When the locked state is released, a non illustrated release lever (handle) fixed to the outside in the width direction of cam shaft 32 is manipulated in the direction of arrow D. In this exemplary embodiment, as shown in FIG. 8, the spring retaining portion 12C is disposed to the rear side of the axial center of the cam shaft 32 (the opposite side in the front-rear direction to that of the spring retaining portion 34A), and moment arm length a, of the moment of rotation about the axial center acting on the arm member 34 due to the biasing force of the tension coil spring 36, is configured so as to gradually get shorter with the rotation of the arm member 34 in the direction D, to reach an arm length b at the limit of rotation. Therefore, a configuration is realized in which the necessary pressing force of the cam member 30 to the worm 24 may be assured by the biasing force of the tension coil spring 36, and yet the manipulation force of the release lever is reduced.

The above described cam member 30 and arm member 34 configure the lock switching mechanism of the present invention.

Furthermore, there is a pair of, left and right, reclining adjusters 10 provided for a single vehicle seat, and the reclining adjuster 10 that is released from the locked state by the manipulation of the release lever is either on the left or on the right side. That is to say, it is configured such that lock releasing manipulation from the reclining adjuster 10 on the main driving side is transmitted to the reclining adjuster 10 on the driven side, and reclining of the seatback relative to the seat cushion becomes possible. Therefore, the lock mechanism 20 is provided with a coupling mechanism 40 for coupling the lock releasing manipulation of the left and right reclining adjusters 10.

Figure 9:
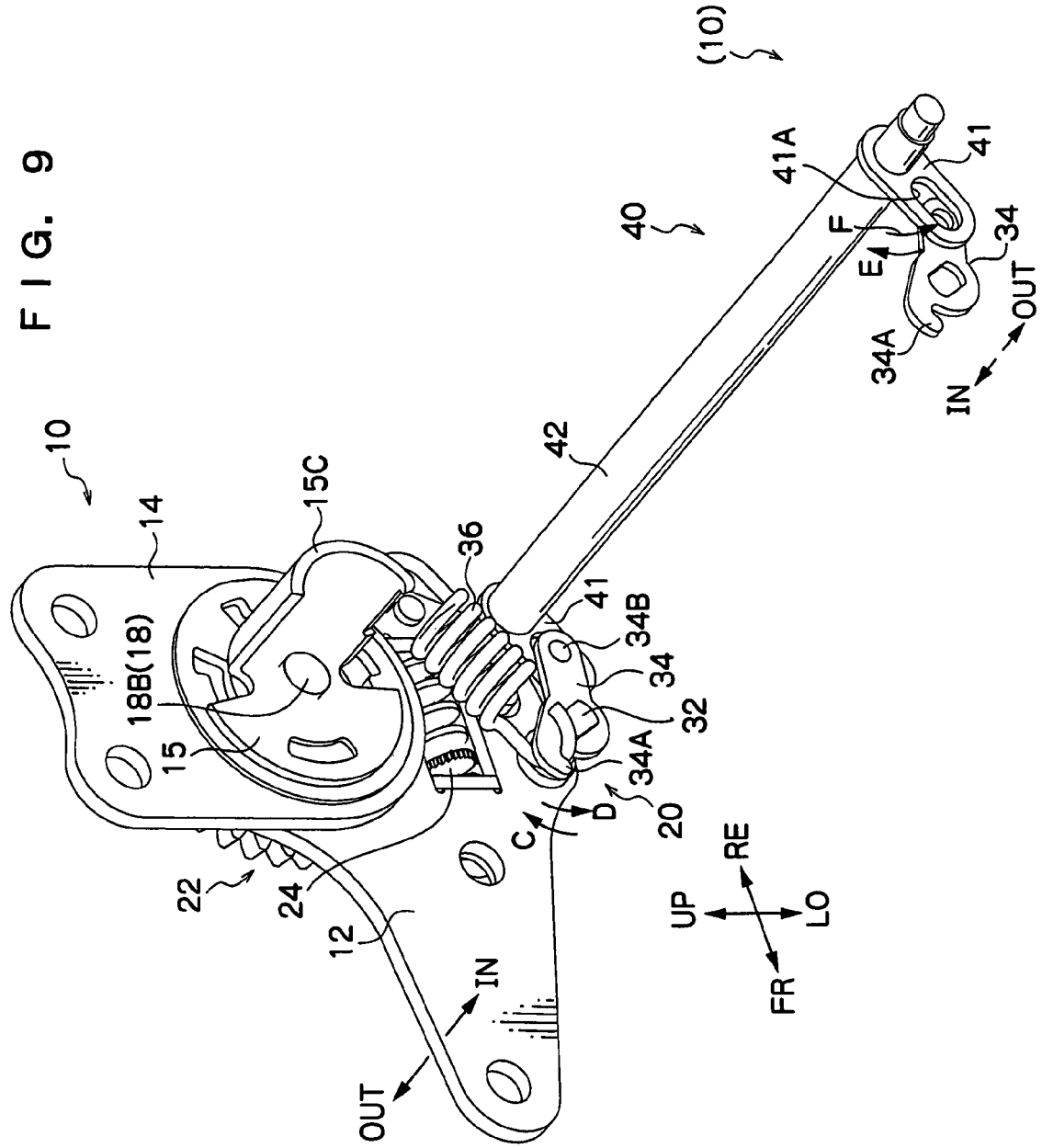
FIG. 9 is a perspective view showing a coupling mechanism for coupling reclining adjusters according to an exemplary embodiment of the present invention, at the left and right of a seat.

The rear end of the coupling mechanism 40 is, as shown in FIG. 8 and FIG. 9, rotationally axially supported at the lower bracket 12, and is provided with a link member 41 with a long hole 41A formed toward the front end thereof. A link pin 34B that is provided at the rear end of the arm member 34 intrudes into the long hole 41A of the link member 41. By so doing, in the coupling mechanism 40, when the arm member 34 rotates in the direction of the arrow D, the link member 41 rotates in the direction of arrow E, and when the arm member 34 rotates in the direction of the arrow C the link member 41 rotates in the direction of the arrow F. As a connecting member there is a connecting pipe 42 that spans across between the rear ends of the ring members 41 of the left and right reclining adjusters 10, and the rotation of the link member 41 in the direction of arrow E, or direction of arrow F, on the main driving side is transmitted to the link member 41 on the driven side (the near side arrow in FIG. 9). In this manner, it is configured such that the left and right ring members 41 mutually rotate in the same direction and by the same angle relative to the seat cushion (lower bracket 12).

It is configured such that, in the reclining adjuster 10 on the driven side, the arm member 34, that is to say the cam member 30, is rotated in the direction of the arrow C (lock switching side) by rotation of the link member 41 in the direction of the arrow F, and the arm member 34 is rotated in the direction of arrow D (lock releasing side) by the rotation of the link member 41 in the direction of arrow E.

Figure 10:
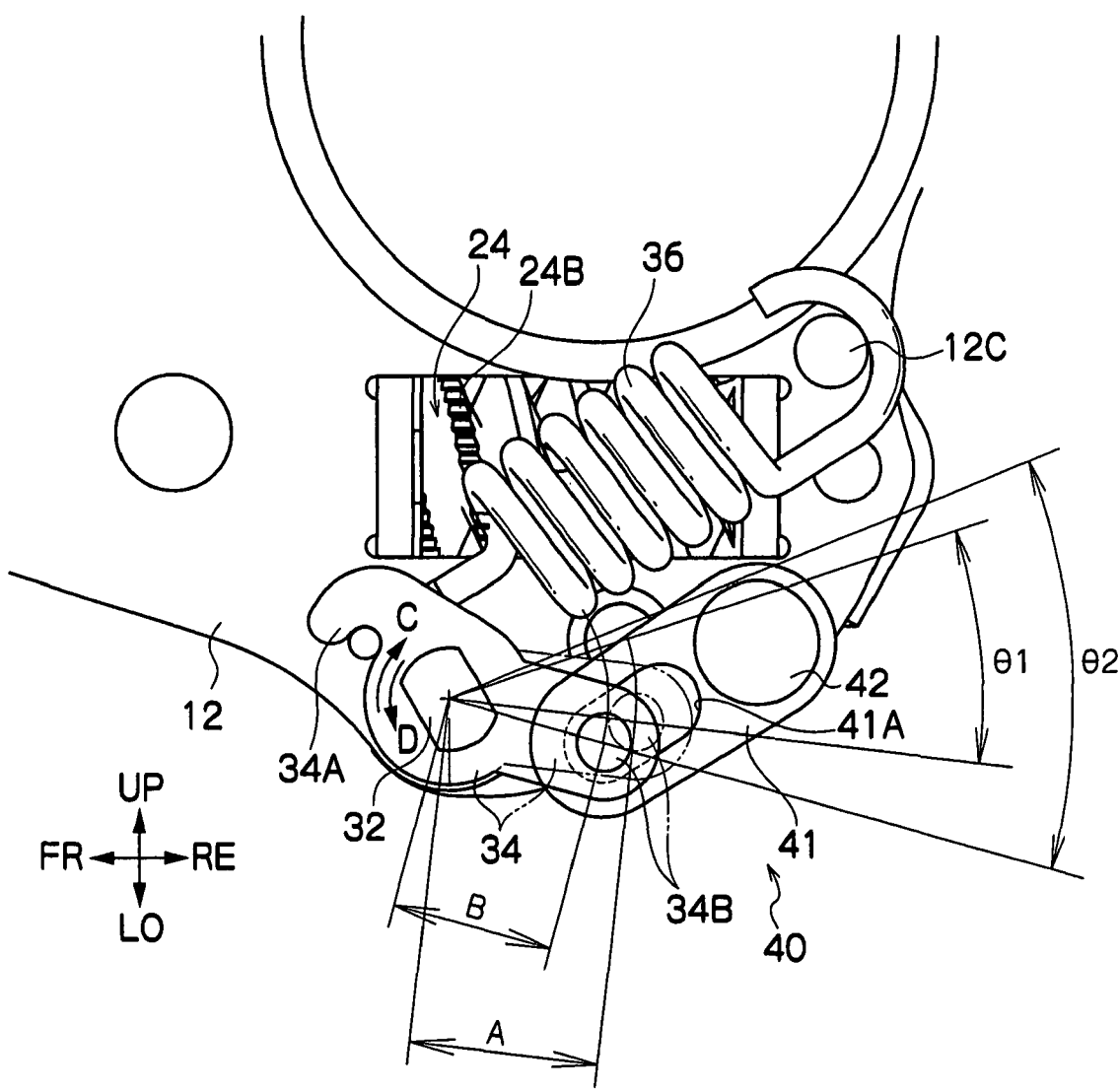
FIG. 10 is lateral view showing the operation range of left and right switching mechanisms by a coupling mechanism for coupling reclining adjusters according to an exemplary embodiment of the present invention, at the left and right of a seat.

In this exemplary embodiment, as shown in FIG. 10, the separation distance B from a rotational axial center 34C to a link pin 34B at the driven side arm member 34 is smaller than the separation distance A from a rotational axial center 34C to a link pin 34B at the main driving side arm member 34 (the member shown with intermittent lines). The left and right rotational axial centers are disposed coaxially to each other. By doing so, it is set such that the rotational angle (link ratio) of the arm member 34 relative to the rotational angle about the rear end of the link member 41 is greater at the driven side than the main driving side in both the direction of arrow C and the direction of arrow D, and the difference in the link ratio is the play in the arm member 34 on the driven side. Dimensional differences (including alignment differences) of the driven side reclining adjuster 10 relative to the main driving side reclining adjuster 10 are absorbed by this play. In the present exemplary embodiment it is set such that the rotational angle $\theta 1$ of the arm member 34 on the main driving side is about 25°, and the rotational angle $\theta 2$ of the arm member 34 on the driven side is about 37.6°.

By the above, a configuration is realized in which, for example, in a vehicle seat to which a pair of reclining adjusters 10 are applied, the arm member 34 of the driven side is reliably synchronized with the main driving side, and occurrence of so called half-lock due to faults with the locking, or faults with the lock releasing, of the driven side, may be prevented. That is to say, the coupling mechanism 40 absorbs the dimensional differences by the above play, and therefore the arm member 34 of the driven side is not restrained by the main driving side, and reliably assumes the locked position and the unlocked position, and thereby realizing a configuration in which insufficiency in the pressing of the cam member 30 on the driven side toward the worm 24 (lock maintaining force), and lateness in the changing over to the unlocked state of the driven side relative to the main driving side, is prevented, and reliable locking and unlocking of the reclining adjuster 10 of the driven side may be realized.

Furthermore, in the reclining adjuster 10 there is the emergency lock mechanism 44 provided between the upper bracket 14 and the lock mechanism 20, for preventing reclining of the seatback relative to the seat cushion when a large load acts on the seatback. As shown in FIG. 1, the emergency lock mechanism 44 is provided with an outer toothed ring gear 46 that is formed in a circular ring shape and has outer teeth 46A formed on an outer peripheral surface thereof. The outer teeth 46A are formed with the tooth width of each of the teeth along the axial line direction of the outer toothed ring gear 46, configuring a spur gear. The outer toothed ring gear 46 is supported by the upper bracket 14 so as to rotate coaxially and integrally with the upper bracket 14 relative to the lower bracket 12.

Figure 11:
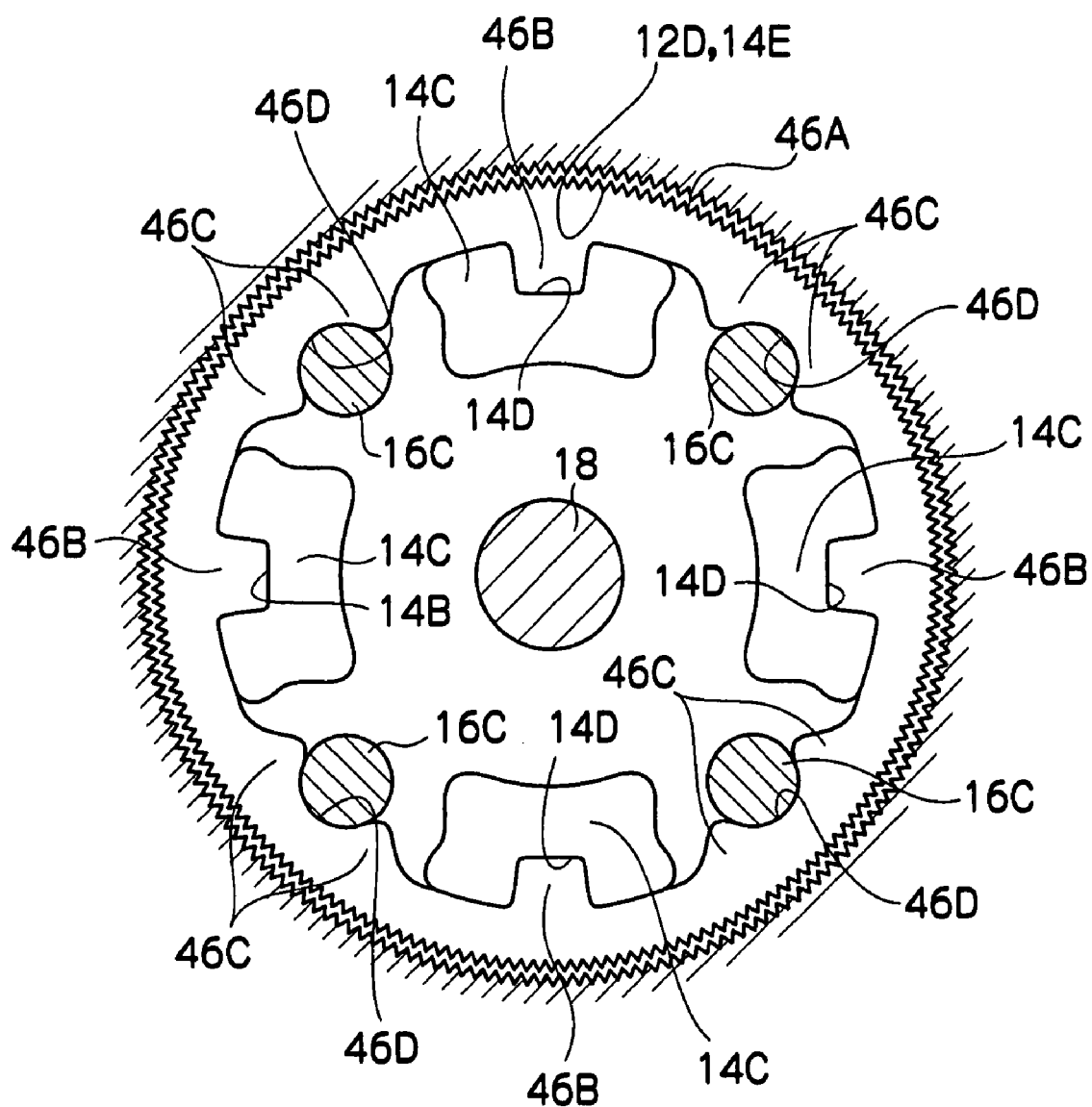
FIG. 11 is a lateral cross-section showing an emergency lock mechanism configuring a reclining adjuster according to an exemplary embodiment of the present invention.

Specifically, as shown in FIG. 11, a circular shaped recess 14B is formed, coaxial to the 14A opening to the lower bracket 12 side. There are plural (four in this exemplary embodiment) connecting protrusions 14C formed from the base face of the circular shaped recess 14B. Connecting recesses 14D are formed at a central recessed portion in the circumferential direction of each of the connecting protrusions 14C, opening to the outside in the radial direction of the circular shaped recesses 14B. Plural (four in this exemplary embodiment) connecting protrusions 46B protrude from the inner peripheral surface of the outer toothed ring gear 46 at constant intervals in the circumferential direction, formed with shapes that correspond to those of the connecting recesses 14D, and each of the connecting protrusions 46B intrudes into a different respective connecting recesses 14D. In this way, the outer toothed ring gear 46 rotates coaxially and integrally with the upper bracket 14 relative to the lower bracket 12, as described above.

Furthermore, between each adjacent connecting protrusions 46B in the circumferential direction, there are two cam protrusions 46C protruding from the inner peripheral surface of the outer toothed ring gear 46 at a portion central in the circumferential direction. Each of the cam protrusions 46C are formed substantially as a mountain shape (taper shape), with the peaks thereof toward the axial center of the outer toothed ring gear 46. There are also recesses 46D formed between the cam protrusions 46C, at a portion central in the circumferential direction between adjacent connecting protrusions 46B in the circumferential direction. Cam pins 16C that protrude facing the inside in the width direction from the disk member 16 intrude into each respective of the recesses 46D. Each of the cam pins 16C is formed in a circular column shape, and contact, or is extremely close to, the cam protrusions 46C on both sides thereof in the circumferential direction. By doing so, in the outer toothed ring gear 46, if relative rotation occurs with the disk member 16, then due to the rotation direction the cam protrusions 46C are pressed by the cam pins 16C toward the outside in the radial direction, and the outer toothed ring gear 46 deforms to expand radially (or there is a break at a portion in the circumferential direction and displacement to the outside in the radial direction). There are thinned recessed portions formed on the reverse side face of each of the cam pins 16C.

Inner teeth 12D that the outer teeth 46A of the radially expanded outer toothed ring gear 46 engage with are formed on the lower bracket 12, as first engageable portions (first inner teeth). Specifically, at the lower bracket 12 there is a circular recess 12E opening toward the inside in width direction with a larger diameter than the diameter of the boss 12A and coaxial to the boss 12A, and inner teeth 12D are formed on the inner peripheral surface of the circular recess 12E. The base portion of the circular recess 12E opens along an edge portion of the boss hole of the boss 12A, and communicates through to the inside of the boss 12A (the base portion of the circular recess 12E configures a step portion with the boss 12A). As shown in FIG. 4B, the outer toothed ring gear 46 before being expanded radially by the cam pins 16C is configured such that the tips of the teeth of the outer teeth 46A thereof are made closely adjacent to the tips of teeth of the inner teeth 12D in a range in which they do not interfere with each other, and such that the outer teeth 46A mesh with the inner teeth 12D if there is the slightest expansion radially.

Furthermore, there are inner teeth 14E formed on the upper bracket 14 as second engageable portions (second inner teeth) for meshing with the outer teeth 46A of the outer toothed ring gear 46 that have been radially expanded. The inner teeth 14E and the inner teeth 12D have the same tooth shape and pitch and the like, and they are meshable with the outer teeth 46A of the outer toothed ring gear 46 at the same time. Therefore, the emergency lock mechanism 44, as shown in FIG. 4A and FIG. 4B, is configured with the outer toothed ring gear 46 disposed on the inside in the radial direction of both the inner teeth 12D and the inner teeth 14E.

In this exemplary embodiment, when the moment Me about the shaft 18 that acts on the upper bracket 14 (see FIG. 12) is about 900 Nm or greater, then relative rotation between the outer toothed ring gear 46 and the disk member 16 is generated and it is set such that the outer teeth 46A mesh with both the inner teeth 12D, 14E. Thereby, it is configured such that when a vehicle seat to which the reclining adjuster 10 is applied is in normal use the emergency lock mechanism 44 does not operate. Therefore, the lockable moment of the lock mechanism 20 is at least the moment Me or above. That is to say, the moment Me that initiates operation of the emergency lock mechanism 44 is set to be the same as or greater than a predetermined moment that does not operate the emergency lock mechanism 44 in normal use (for example, about 900 Nm), and also the same as or less than the moment that the lock mechanism 20 can withstand before the retention of the seatback by the lock mechanism 20 is released. In this exemplary embodiment the moment that the lock mechanism 20 can withstand is set, as is the operation initiation moment Me of the emergency lock mechanism 44, at about 900 Nm, and configured to reduce the size of the lock mechanism 20.

Explanation will now be given of the disposition of the outer toothed ring gear 46, together with explanation of the details of the configuration of the shaft 18. As shown in FIG. 4A, a circular plate shaped flange portion 18A, that projects to the outside in the radial direction, is formed at a central portion in the axial line direction of the shaft 18. The upper bracket 14 and the spring attachment member 15 are fitted over the shaft 18 on the inside in the width direction relative to the flange portion 18A, and are sandwiched between the flange portion 18A and a projecting portion 18B that is formed by crimping over the inside end in the width direction of the shaft 18. The disk member 16 and the worm wheel 22 are fitted over the shaft 18 to the outside in the width direction relative to the flange portion 18A, and are sandwiched between the flange portion 18A and a projecting portion 18C that is formed by crimping over the outside end in the width direction of the shaft 18.

Thereby, each of the upper bracket 14 and worm wheel 22, which are supported by the shaft 18, are configured so as not to be able to come together or move away from each other in the axial line (thrust) direction of the shaft 18. Furthermore, the upper bracket 14, the spring attachment member 15, the disk member 16 and the worm wheel 22 are configured so that they are prevented from being displaced in the radial direction by the force of the tight fitting due to the crimping (a friction force based on residual push fitting force toward the flange portion 18A). Also, as described above, by providing the flange portion 18A, the upper bracket 14 and the worm wheel 22 do not sandwich the lower bracket 12 with the above tight fitting force, and smooth rotation of the upper bracket 14 and the worm wheel 22 relative to the lower bracket 12 is secured.

As shown in FIGS. 4A and 4B, the outer toothed ring gear 46 is disposed in the axial line direction between the upper bracket 14 and the disk member 16, and within the space that is surrounded by the inner peripheral surfaces of the circular recesses 12E, 14B. Thereby, as shown in FIG. 11, the outer teeth 46A oppose the inner teeth 12D, 14E around the complete circumference. The outer toothed ring gear 46, similar to the case of the above described lower bracket 12, is not sandwiched by the above tight fitting force between the upper bracket 14 and the disk member 16, but the outer toothed ring gear 46 is configured with a small resistance to rotation relative to the disk member 16. The outer toothed ring gear 46 that configures the emergency lock mechanism 44 is not affected by wobbling/play of the seatback when locked by the lock mechanism 20.

As has been explained above, the cam pins 16C of the disk member 16 and the cam protrusions 46C of the outer toothed ring gear 46 configure the emergency lock actuation mechanism and the cam mechanism of the present invention.

Furthermore, as shown in FIG. 1, FIG. 2 and FIG. 4A, the reclining adjuster 10 is provided with a cover member 48. The cover member 48 is assembled to the lower bracket 12 through a spacer 50, and the components that configure the lock mechanism 20, the worm 24, the shaft bearing 26, the shaft bearing 28, the cam member 30 and the like, are mainly accommodated between the cover member 48 and a lower portion of the lower bracket 12. The cover member 48 is provided with a window 48A, corresponding to the window 12B of the lower bracket 12, and a portion of the worm 24 intrudes therein. The release lever for releasing the locked state of the lock mechanism 20, is fitted to the cam shaft 32 that projects from the cover member to the outside in the width direction.

Explanation will now be given of the operation of the present exemplary embodiment.

The reclining adjuster 10 of the above configuration is normally, as shown in FIG. 6, with the cam member 30 located in the locked position due to the biasing force of the tension coil spring 36, and since relative rotation of the upper bracket 14 relative to the lower bracket 12 is prevented, the seatback maintains a given angle relative to the seat cushion. In normal operation, there is no moment acting about the shaft 18 on the upper bracket 14 that exceeds the withstanding moment of the lock mechanism 20 or the operation initiation moment of the emergency lock mechanism 44 (both about 900 Nm), and the seatback is retained, as described above, with the predetermined angle relative to the seat cushion.

When a seat occupant or the like manipulates the release lever in the direction of the arrow D, the cam member 30 rotates in the direction of the arrow D, up to the unlocked position. Thereby, rotation is permitted of the upper bracket 14 relative to the lower bracket 12 due to the load that is input to the upper bracket 14. Therefore, the seatback reclines to the front side due to the biasing force of the balance spring 17, or reclines to the rear side due to a load that is greater than that of the biasing force toward the rear. When the release lever is released, the cam member 30 reverts to the locked position due to the biasing force of the tension coil spring 36, and the seatback maintains the adjusted reclining angle with respect to the seat cushion.

If a large load is input to the seatback toward the front, or toward the rear, for example during a collision of the vehicle to which the vehicle seat is mounted, then there is rotation of the upper bracket 14 relative to the worm wheel 22 that has been made non-rotatable by the lock mechanism 20 (worm 24), and relative rotation occurs between the disk member 16 (worm wheel 22) and the outer toothed ring gear 46 (upper bracket 14). Due to this relative rotation, each of the cam pins 16C of the disk member 16 is pressed to the outside in the radial direction by the cam protrusion 46C that is on one side thereof in the circumferential direction, and the outer toothed ring gear 46 is deformed and expanded radially. Then, the outer teeth 46A that are formed on the outer peripheral surface of the outer toothed ring gear 46 mesh with the inner teeth 12D of the lower bracket 12 and the inner teeth 14E of the upper bracket 14, respectively.

In so doing relative rotation of the upper bracket 14 relative to the lower bracket 12, that is to say further (more than the above described relative rotation) tilting of the seatback relative to the seat cushion to the front side or the rear side, is prevented. The relationship between the displacement d of the top edge of the seatback during the input of the large load and the support moment M is like that shown in FIG. 12. FIG. 12 shows that, in a region X up to a displacement of about 20 mm (a moment of about 900 Nm) the lock mechanism 20 supports the load of the seatback, that is to say supports the moment about the shaft 18, in an approximately constant region Y of from a displacement of about 20 mm to about 27 mm, relative rotation occurs between the outer toothed ring gear 46 and the disk member, and in a region Z of displacement exceeding about 27 mm up to where the limit of the moment is generated (where a portion in the circumferential direction of the boss 12A or the circular recess 12E breaks), the load of the seatback, that is to say the moment about the shaft 18, is in the main supported by the emergency lock mechanism 44.

Here, in the reclining adjuster 10, the emergency lock mechanism 44 is configured to mesh the outer teeth 46A of the outer toothed ring gear 46 not just with the inner teeth 12D of the lower bracket 12, but also to mesh with the inner teeth 14E of the upper bracket 14 that rotate integrally relative to the lower bracket 12, and, therefore, the load of the seatback (moment) is distributed and supported, being supported by the lower bracket 12 by the route through the upper bracket 14, connecting protrusions 14C, connecting protrusions 46B, outer toothed ring gear 46 and outer teeth 46A, and also being supported from the upper bracket 14 directly by the lower bracket 12, by the outer teeth 46A, and the stress on each of the components is relieved.

In particular, by the meshing of the outer teeth 46A of the outer toothed ring gear 46 at the inner teeth 12D, 14E that are located more to the outside in the radial direction that the connection positions of the connecting protrusions 14C and connecting protrusions 46B, since the outer teeth 46A directly transmit load from the upper bracket 14 to the lower bracket 12, a large moment may be supported (the moment arm is large). That is to say, in a configuration in which the outer teeth 46A of the outer toothed ring gear 46 mesh at the inner teeth of the lower bracket only, the connecting protrusions 46B of the outer toothed ring gear 46 and the engaging connecting protrusions 14C of the upper bracket 14 (portions on both sides of the connecting recesses 14D) are weak against the above moment, and it is necessary to increase the radius (extend the size of the moment arm) in order to ensure the strength of the connecting protrusions 14C. However, in the reclining adjuster 10, in which the outer toothed ring gear 46 meshes with the upper bracket 14 as well as the lower bracket 12, the connecting protrusions 14C are required mainly to withstand (at least) the moment in the region Y of FIG. 12, and a large moment maybe supported without relying on increasing the strength of the connecting protrusions 14C.

Further particularly, in the lower bracket 12 the boss 12A and the circular recess 12E have a function of supporting the upper bracket 14 and the like, and the inner teeth 12D have an emergency locking function, but since the inner teeth 12D are formed on the inner peripheral surface of the circular recess 12E that has a relatively large diameter, the outer toothed ring gear 46 may have a larger diameter (increasing the withstanding moment) without increasing the size overall. Furthermore, since no load is directly applied to the boss 12A that does not have the inner teeth 12D formed thereon, there is suppression against the boss 12A breaking a portion in the circumferential direction of the peripheral wall portion of the circular recess 12E of the lower bracket 12 (increasing the strength of the lower bracket 12). Thereby, the reclining adjuster 10, also from point of view of the strength of the lower bracket 12, may support a large moment without an increase in size.

By the above, the reclining adjuster 10 is able to realize a configuration that obtains effective prevention against the tilting of the seatback due to the action of a large load in an emergency, yet remain compact, and has sufficient strength. Specifically, by configuring the outer toothed ring gear 46 with an external diameter of 60 mm, as shown in FIG. 12, a withstanding moment of about 2100 Nm may be obtained. Furthermore, the displacement of the top edge of the seatback when the maximum moment acts is 41 mm, and sufficient tilting prevention ability is realized. This ability is equivalent to that of using a outer toothed ring gear 46 with an external diameter of 80 mm, if the outer teeth 46A of the outer toothed ring gear 46 were to be configured to mesh with the inner teeth of the lower bracket (a configuration in which the connecting protrusions 14C are also larger when compared to those of the reclining adjuster 10), and equivalent to each ring gear being formed with an external contour of 50 mm, in a configuration in which different outer toothed ring gears 46, are aligned as two plates in parallel in the axial direction, for meshing with the lower bracket teeth. The reclining adjuster 10 is made more compact in a balanced way both in the radial direction and axial direction, and obviously may be designed with reduced weight.

Also here, since in the reclining adjuster 10 if the lock mechanism 20 meshes the worm 24 with the worm wheel 22, and in this state the axial line direction of the worm 24 is inclined relative to the axial line direction in the unlocked position, then the apparent frictional angle is made larger than the lead angle and rotation of the worm wheel 22 is prevented. Therefore, when compared to a configuration in which prevention of rotation of the worm 24 is by an engagement pawl engaging with the notches 24B, since there is no stress concentration generated at the engagement pawl the load that may be withstood becomes larger. Since the withstanding moment of the lock mechanism is made to be about 900 Nm, which is close to the withstanding moment necessary in normal operational conditions, or put in another way, since it is made such that a moment that is the same as or more than that that operates in normal operational conditions is supported by the emergency lock mechanism 44, the lock mechanism 20 may be designed even more compact.

In particular, since the lock mechanism 20 is contacted to the worm 24 at two or more points, backlash is eliminated. Thereby, in the locked state of the lock mechanism 20, that is to say in the state where the seatback is maintained at a given angle to the seat cushion, wobbling/play of the seatback relative to the seat cushion in a reclining movement direction may be significantly suppressed. Thereby, deterioration in the seating comfort, or the generation of extraneous noise, may be prevented.

In such a configuration described above in which, in order to eliminate backlash of the worm 24 and the worm wheel 22, the worm is pressed against the worm wheel by an engagement pawl that engages the notches 24B, since the backlash of the engagement pawl and the notches 24B of the worm 24 is not eliminated, there is a limit to the reduction that may be made in the wobbling/play of the seatback. However in the reclining adjuster 10, since it is configured such that simply the cam member 30 (plate spring member 38) presses the worm 24, there is no generation of backlash therebetween, and significant reduction may be made in the wobbling/play of the seatback, as described above. In the configuration in which the worm is pressed against the worm wheel by the engagement pawl described above, since the engagement pawl that intrudes into the notches 24B presses the worm and moves it to the worm wheel side, the worm 24 moves in a direction that is along a plane orthogonal to the axial line of the worm wheel, and is not able to be inclined in the direction of the arrow B.

Furthermore, as explained above, in the lock mechanism 20, the locking functionality and the backlash elimination functionality are achieved by the same mechanism (a superimposed structure), therefore the structure is simplified and reliability is high. Furthermore, the shaft bearing 28, in which the ball 28D is disposed between the bracket side recess 28C and the worm side recess 28A that have circular conical surfaces as their internal faces, may simply guide the worm that is pressed up by the cam member 30 also in the direction of the arrow B in FIG. 7, to reach the locked position, and therefore, the structure of the shaft bearings does not become complicated, and by being able to make the pushing direction by the cam member 30 to be the upward direction, the support structure of the cam member 30 is simplified (a simple structure with the longitudinal direction rotational shaft in the width direction).

Furthermore, in the reclining adjuster 10, since the shaft 18 nips together and retains the upper bracket 14 (the spring attachment member 15), the disk member 16, and the worm wheel 22, by crimping at both ends in the axial direction, there is no mutual movement together, or apart, of each of the components at the seatback side in the axial line direction. Therefore, in the reclining adjuster 10, there is a reduction in the overall wobbling/play in the width direction in the locked state.

Furthermore, since the component that is nipping and retaining the upper bracket 14, (the spring attachment member 15), the disk member 16, and the worm wheel 22 in the axial direction, connecting them together, is the shaft 18 that passes through axial center portions thereof, a configuration of the emergency lock mechanism 44 is realized with a simple structure in which an increase in the number of components is prevented, as well as allowing relative rotation of the upper bracket 14 and the disk member 16 (the worm wheel 22).

Furthermore, since the flange portion 18A is formed at a central portion in the axial line direction of the shaft 18, with a configuration in which there is no nipping force acting between the upper bracket 14 and the worm wheel 22, each of these components at the seatback side are able to rotate smoothly with respect to the lower bracket 12 that is disposed between the upper bracket 14 and the worm wheel 22. That is to say, for example, in configurations in which the upper bracket 14 and the like are supported at one end of a shaft at the lower bracket 12 side (cover member 48 and the like), in order that plural components disposed on the upper bracket 14 side on either side of the lower bracket 12 rotate, gaps are set in the axial line direction between the plural components on the upper bracket 14 side, but in the reclining adjuster 10 a configuration is realized in which smooth rotation relative to the lower bracket 12 is secured, and also the moving together and apart in the axial line direction of components on the upper bracket 14 side is prevented.

Furthermore, the coupling mechanism 40 couples the left and right reclining adjusters 10, and since the range of rotation of the arm member 34 on the driven side (the amount of movement of the cam member 30) is set to be larger than that of the main driving side at both the lock side and the elock release side, the occurrence in the reclining adjusters 10 of locking faults such as half-lock (faults in lock releasing) are prevented.

In this manner, in the reclining adjuster 10 according to the present exemplary embodiment, the locking of rotation of the seatback relative to the seat cushion may be assured. That is to say, while being compact and light weight, the withstanding moment by the emergency lock mechanism 44 when a large load is input may be increased, wobbling/play in the rotation direction by the lock mechanism 20 may be reduced, and also the wobbling/play in the width direction due to the connection structure may be reduced by the shaft 18, and also displacement of the seatback relative to the seat cushion may be prevented when locked.

In the above exemplary embodiment, there is shown an example in which four of the connecting protrusions 14C of the upper bracket 14 (and connecting protrusions 46B of the outer toothed ring gear 46) are provided, but, for example, if the outer toothed ring gear 46 is reduced in size, reducing the number of connecting protrusions 14C, as shown in FIG. 13, but securing the size of each of the connecting protrusions 14C, and thereby preventing a reduction in the strength of the connecting protrusions 14C, is effective. FIG. 13 shows an example in which three of the connecting protrusions 14C are provided. In this figure, the inner teeth 14E are not illustrated in the figure.

Furthermore, the above exemplary embodiment, is a preferable configuration with a structure in which there are, in the reclining adjuster 10, three features of interconnecting structures of the emergency lock mechanism 44, the lock mechanism 20, and the shaft 18, but, the present invention is not limited thereto, and the reclining adjuster 10 may be configured with at least one of the above three featured structures. Furthermore, the coupling mechanism 40 may be applied to a reclining adjuster other than the reclining adjuster 10.

Also, in the above exemplary embodiment, an example is shown in which the notches 24B are provided to the worm 24, but the present invention is not limited thereto, and, for example, the lock mechanism 20 may be configured with a worm 24 on which there are no notches 24B formed. Furthermore, there is also the possibility that the plate spring member 38 is dispensed with.

Furthermore, in the above exemplary embodiment, an example is shown in which the worm wheel 22 and the separate component of the disk member 16 are provided, but the present invention is not limited thereto, and the disk member 16 (the functionality thereof) may be integrated into the worm wheel 22, or part of the functionality of the disk member 16 (for example the functionality of being supported by the lower bracket 12) may be integrated into the worm wheel 22, together with ascribing other functions to other separate components (such as transferring over to the worm wheel the functionality of the cam pins 16C for deforming the outer toothed ring gear 46).

EXPLANATION OF THE REFERENCE NUMERALS

10 reclining adjuster 10
12 lower bracket (first bracket)
12D inner teeth (first engageable portion, first inner teeth)
14 upper bracket (second bracket)
14E inner teeth (second engageable portion, second inner teeth)
16 disk member (emergency lock actuation means)
16C cam pins (emergency lock actuation means, cam mechanism)
18 shaft (connecting member, rotational shaft)
18A flange portion
18B projecting portion
18C projecting portion
20 lock mechanism (lock means)
22 worm wheel (lockable member, second gear)
24 worm (lock member, first gear)
26, 28 shaft bearing
26A, 28A worm side recess
26, 28C bracket side recess
26D, 28D ball
30 cam member (lock switch means)
34 arm member (lock switch means)
40 coupling mechanism (coupling means)
41 ring member
42 connecting pipe (connecting member)
44 emergency lock mechanism (emergency lock actuation means)
46 outer toothed ring gear (engaging member)
46A outer teeth
46C cam protrusions (emergency lock actuation means, cam mechanism)

The invention claimed is:

1. A reclining adjuster comprising:
a first bracket, fixed to a seat cushion;
a second bracket, rotatably connected to the first bracket and fixed to a seatback, such that changes in a reclining angle of the seatback relative to the seat cushion are possible;
a lock mechanism, provided between the first bracket and the second bracket, and able to adopt a locked state retaining the second bracket at a given reclining angle relative to the first bracket, and to adopt a released state permitting changes to the angle of the second bracket relative to the first bracket;
an engaging member provided to one or other of the first bracket or the second bracket so as to rotate integrally in the direction of changing the reclining angle;
a first engageable portion, provided to the first bracket and engageable by the engaging member;
a second engageable portion, provided to the second bracket and engageable by the engaging member; and
an emergency lock actuation mechanism, provided between the second bracket and the lock mechanism, and when the lock mechanism is in the locked state and a relative rotation of a predetermined angle or greater is generated between the second bracket and the lock mechanism, the emergency lock actuation mechanism engaging the engaging member with each of the first engageable portion and the second engageable portion, and preventing the relative rotation,
wherein the lock mechanism comprises:
a first gear that is rotatably axially supported at the first bracket through a first shaft bearing, the first shaft bearing comprising:
a first gear side recess that is recessed into an axial center portion at one end of the first gear;
a first bracket side recess that is recessed into the first shaft bearing and that is fixed to the first bracket so as to open toward the first gear side recess; and a ball that intrudes into the first gear side recess and the first bracket side recess, the first gear side recess and the first bracket side recess each having internal faces that form substantially circular conical surfaces, and a surface area of the opening of the first bracket side recess is substantially the same as that of the first gear side recess;

a second gear that is axially supported so as to be able to rotate around an axis integrally with the second bracket, and is able to drive the first gear by the rotation;

a lock switching mechanism provided so that it is able to angularly displace the axial line of the first gear, and is able to switch, by the angular displacement, between an unlocked state in which the first gear is able to be driven from a second gear side, and a locked state in which it is not possible for the first gear to be driven from the second gear side; and a second shaft bearing comprising:
  a second gear side recess that is recessed into an axial center portion at the other end of the first gear;
  a second bracket side recess that is recessed into the second shaft bearing that is fixed to the first bracket so as to open toward the second gear side recess; and
  a ball that intrudes into the second gear side recess and the second bracket side recess,
  the second gear side recess and the second bracket side recess each having internal faces that form substantially circular conical surfaces, and the surface area of the opening of the second bracket side recess is larger than that of the second gear side recess.

2. The reclining adjuster according to claim 1, wherein the emergency lock actuation mechanism is set so as to actuate at a moment that is a predetermined value that operates the second bracket or greater, and that is the same as, or less than, a maximum moment that the lock mechanism is able to support.

3. The reclining adjuster according to claim 2, wherein
the engaging member is formed in a ring shape with outer teeth formed on the outer periphery thereof,
the first engageable portion is formed on the first bracket and comprises first inner teeth that are meshable with the outer teeth,
the second engageable portion is formed on the second bracket and comprises second inner teeth that are meshable with the outer teeth, and
the emergency lock actuation mechanism is a cam mechanism that converts a force that is generated by a relative rotation of a predetermined angle or greater occurring between the seat cushion and the seatback when the lock mechanism is in the locked state, into a force that moves the outer teeth toward the outside in a radial direction.

4. The reclining adjuster according to claim 2,
the lock mechanism further comprising:
  a lockable member, provided on the second bracket so as to rotate integrally therewith relative to the first bracket; and
  a lock member, that adopts a locked position in which it engages with the lockable member and locks rotation of the lockable member relative to the first bracket, and that adopts a released position that releases an engaging state and permits rotation of the lockable member relative to the first bracket, wherein
the reclining adjuster further comprises a connecting member that connects the second bracket and the lockable member such that they do not move closer together or further apart in the rotational axial line direction relative to the first bracket.

5. The reclining adjuster according to claim 1, wherein
the engaging member is formed in a ring shape with outer teeth formed on the outer periphery thereof,
the first engageable portion is formed on the first bracket and comprises first inner teeth that are meshable with the outer teeth,
the second engageable portion is formed on the second bracket and comprises second inner teeth that are meshable with the outer teeth, and
the emergency lock actuation mechanism is a cam mechanism that converts a force that is generated by a relative rotation of a predetermined angle or greater occurring between the seat cushion and the seatback when the lock mechanism is in the locked state, into a force that moves the outer teeth toward the outside in a radial direction.

6. The reclining adjuster according to claim 5,
the lock mechanism further comprising:
  a lockable member, provided on the second bracket so as to rotate integrally therewith relative to the first bracket; and
  a lock member, that adopts a locked position in which it engages with the lockable member and locks rotation of the lockable member relative to the first bracket, and that adopts a released position that releases an engaging state and permits rotation of the lockable member relative to the first bracket, and wherein
the reclining adjuster further comprises a connecting member that connects the second bracket and the lockable member such that they do not move closer together or further apart in the rotational axial line direction relative to the first bracket.

7. The reclining adjuster according to claim 1,
the lock mechanism further comprising:
  a lockable member, provided on the second bracket so as to rotate integrally therewith relative to the first bracket; and
  a lock member, that adopts a locked position in which it engages with the lockable member and locks rotation of the lockable member relative to the first bracket, and that adopts a released position that releases an engaging state and permits rotation of the lockable member relative to the first bracket, wherein
the reclining adjuster further comprises a connecting member that connects the second bracket and the lockable member such that they do not move closer together or further apart in the rotational axial line direction relative to the first bracket.

8. The reclining adjuster according to claim 7, wherein
the connecting member also functions as the rotation axis of the second bracket and the lockable member relative to the first bracket.

9. The reclining adjuster according to claim 8, wherein
the connecting member axially supports the second bracket and the lockable member on mutually opposite sides in the axial line direction relative to the first bracket, sandwiches the second bracket between a flange portion provided at a central portion thereof in the axial line direction and a first projecting portion formed at one end thereof in the axial line direction, and sandwiches the lockable member between the flange portion and a second projecting portion formed at the other end thereof in the axial line direction.

10. The reclining adjuster according to claim 9, wherein
the lock member is a first gear that is rotatably axially supported at the first bracket through a shaft bearing,
the lockable member is a second gear that is axially supported so as to be able to rotate around an axis integrally with the second bracket, and is able to drive the first gear by the rotation, and
the reclining adjuster further comprises:
a lock switching mechanism provided so that it is able to angularly displace the axial line of the first gear, and is able to switch, by the angular displacement, between an unlocked state in which the first gear is able to be driven from a second gear side, and a locked state in which it is not possible for the first gear to be driven from the second gear side.

11. The reclining adjuster according to claim 8, wherein
the lock member is a first gear that is rotatably axially supported at the first bracket through a shaft bearing,
the lockable member is a second gear that is axially supported so as to be able to rotate around an axis integrally with the second bracket, and is able to drive the first gear by the rotation, and
the reclining adjuster further comprises:
a lock switching mechanism provided so that it is able to angularly displace the axial line of the first gear, and is able to switch, by the angular displacement, between an unlocked state in which the first gear is able to be driven from a second gear side, and a locked state in which it is not possible for the first gear to be driven from the second gear side.

12. The reclining adjuster according to claim 1, wherein
the first gear and the second gear are a worm and worm wheel configured with a lead angle that is greater than the friction angle, and
the lock switching mechanism, in the locked state, displaces the axial line of the worm relative to the axial line of the worm wheel, and meshes the worm and the worm wheel such that the apparent friction angle of the worm and the worm wheel becomes greater than the lead angle.

13. A reclining adjuster comprising:
a first bracket, fixed to a seat cushion;
a second bracket, rotatably connected to the first bracket and fixed to a seatback, such that changes in a reclining angle of the seatback relative to the seat cushion are possible;
a lockable member, provided on the second bracket so as to rotate integrally therewith relative to the first bracket, the lockable member being a first gear that is rotatably axially supported at the first bracket through a first shaft bearing, the first shaft bearing comprising:
a first gear side recess that is recessed into an axial center portion at one end of the first gear;
a first bracket side recess that is recessed into the first shaft bearing and that is fixed to the first bracket so as to open toward the first gear side recess; and
a ball that intrudes into the first gear side recess and the first bracket side recess,
the first gear side recess and the first bracket side recess each having internal faces that form substantially circular conical surfaces, and a surface area of the opening of the first bracket side recess is substantially the same as that of the first gear side recess;
a lock member, that adopts a locked position in which it engages with the lockable member and locks rotation of the lockable member relative to the first bracket, and that adopts a released position that releases an engaging state and permits rotation of the lockable member relative to the first bracket, the lockable member being a second gear that is axially supported so as to be able to rotate around an axis integrally with the second bracket, and is able to drive the first gear by the rotation;
a connecting member that connects the second bracket and the lockable member such that they do not move closer together or further apart in the rotational axial line direction relative to the first bracket;
a lock switching mechanism provided so that it is able to angularly displace the axial line of the first gear, and is able to switch, by the angular displacement, between an unlocked state in which the first gear is able to be driven from a second gear side, and a locked state in which it is not possible for the first gear to be driven from the second gear side;
a second shaft bearing comprising:
a second gear side recess that is recessed into an axial center portion at the other end of the first gear;
a second bracket side recess that is recessed into the second shaft bearing that is fixed to the first bracket so as to open toward the second gear side recess, and
a ball that intrudes into the second gear side recess and the second bracket side recess,
the second gear side recess and the second bracket side recess each have internal faces that form substantially circular conical surfaces, and the surface area of the opening of the second bracket side recess is larger than that of the second gear side recess.

14. The reclining adjuster according to claim 13, wherein
the connecting member also functions as the rotation axis of the second bracket and the lockable member relative to the first bracket.

15. The reclining adjuster according to claim 13, wherein
the first gear and the second gear are a worm and worm wheel configured with a lead angle that is greater than the friction angle, and
the lock switching mechanism, in the locked state, displaces the axial line of the worm relative to the axial line of the worm wheel, and meshes the worm and the worm wheel such that the apparent friction angle of the worm and the worm wheel becomes greater than the lead angle.

16. The reclining adjuster according to claim 15, wherein
the lock switching mechanism, when switching from the unlocked state to the locked state, presses one end in the axial line direction of the worm toward the worm wheel side along a plane that is orthogonal to the axial line of the worm wheel.

17. A reclining adjuster comprising:
a first bracket, fixed to a seat cushion;
a second bracket, rotatably connected to the first bracket and fixed to a seatback, such that changes in a reclining angle of the seatback relative to the seat cushion are possible;
a first gear that is rotatably axially supported at the first bracket through a first shaft bearing, the first shaft bearing comprising:
a first gear side recess that is recessed into an axial center portion at one end of the first gear;
a first bracket side recess that is recessed into the first shaft bearing and that is fixed to the first bracket so as to open toward the first gear side recess; and
a ball that intrudes into the first gear side recess and the first bracket side recess,
the first gear side recess and the first bracket side recess each having internal faces that form substantially circular conical surfaces, and a surface area of the opening of the first bracket side recess is substantially the same as that of the first gear side recess;
a second gear that is axially supported so as to be able to rotate around an axis integrally with the second bracket, and is able to drive the first gear by the rotation;
a lock switching mechanism provided so that it is able to angularly displace the axial line of the first gear, and is able to switch, by the angular displacement, between an unlocked state in which the first gear is able to be driven from a second gear side, and a locked state in which it is not possible for the first gear to be driven from the second gear side,
a second shaft bearing comprising:
  a second gear side recess that is recessed into an axial center portion at the other end of the first gear;
  a second bracket side recess that is recessed into the second shaft bearing that is fixed to the first bracket so as to open toward the second gear side recess; and
  a ball that intrudes into the second gear side recess and the second bracket side recess,
  the second gear side recess and the second bracket side recess each having internal faces that form substantially circular conical surfaces, and the surface area of the opening of the second bracket side recess is larger than that of the second gear side recess.

18. The reclining adjuster according to claim 17, wherein
the first gear and the second gear are a worm and worm wheel configured with a lead angle that is greater than the friction angle, and
the lock switching mechanism, in the locked state, displaces the axial line of the worm relative to the axial line of the worm wheel, and meshes the worm and the worm wheel such that the apparent friction angle of the worm and the worm wheel becomes greater than the lead angle.

* * * * *